US007650462B2

(12) United States Patent
Nakagawa et al.

(10) Patent No.: US 7,650,462 B2
(45) Date of Patent: Jan. 19, 2010

(54) STORAGE SYSTEM AND STORAGE CONTROL APPARATUSES WITH COMPRESSION AND LOAD BALANCING

(75) Inventors: Yutaka Nakagawa, Yokohama (JP); Yusuke Nonaka, Sagamihara (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/375,110

(22) Filed: Mar. 15, 2006

(65) Prior Publication Data

US 2007/0174536 A1 Jul. 26, 2007

(30) Foreign Application Priority Data

Jan. 25, 2006 (JP) ............................ 2006-015894

(51) Int. Cl.
*G06F 12/00* (2006.01)
*G06F 13/00* (2006.01)

(52) U.S. Cl. ....................... 711/112; 709/239; 709/247; 707/10; 711/154; 711/221

(58) Field of Classification Search .................. 711/112
See application file for complete search history.

(56) References Cited

U.S. PATENT DOCUMENTS 6,802,021 B1 10/2004 Cheng et al.
2002/0169928 A1* 11/2002 Kimura et al. .............. 711/137
2003/0204597 A1* 10/2003 Arakawa et al. ............ 709/226
2003/0221063 A1* 11/2003 Eguchi et al. ............... 711/114
2005/0060506 A1* 3/2005 Higaki et al. ............... 711/162
2005/0138241 A1 6/2005 Fukuzawa et al.
2005/0246491 A1 11/2005 Yamamoto et al.
2006/0036899 A1* 2/2006 Nemoto et al. ................. 714/5

(Continued)

FOREIGN PATENT DOCUMENTS

EP 0 747 822 A2 6/1996

(Continued)

OTHER PUBLICATIONS

The Extended European Search Report mailed Jul. 7, 2009.

*Primary Examiner*—Brian R Peugh
*Assistant Examiner*—Prasith Thammavong
(74) *Attorney, Agent, or Firm*—Stites & Harbison PLLC; Juan Carlos A. Marquez, Esq.

(57) ABSTRACT

In this invention, when execution of an special function executable only by a second storage control apparatus connected to a first storage control apparatus is requested by a higher-level apparatus, the special function is caused to be executed by a second storage control apparatus, and appropriate load balancing is achieved. An executing apparatus judgment section, upon receiving an execution request from a host, uses a function management section and a state detection section to decide which storage control apparatus should execute the function. An execution instruction section issues an instruction to execute the function to the function execution section of the storage control apparatus determined to be the executing apparatus. By this means, even in the case of an special function executable only by a storage control apparatus, the function can be caused to be executed. Hence a connection source storage control apparatus can appear to have increased functionality, without installing the function on the connection source storage control apparatus.

4 Claims, 19 Drawing Sheets

U.S. PATENT DOCUMENTS

| | | | | |
|---|---|---|---|---|
| 2006/0047908 | A1* | 3/2006 | Chikusa et al. | 711/114 |
| 2007/0294531 | A1* | 12/2007 | Alten | 713/168 |
| 2008/0250178 | A1* | 10/2008 | Haustein et al. | 710/107 |
| 2008/0263244 | A1* | 10/2008 | Mizuno | 710/68 |

FOREIGN PATENT DOCUMENTS

| | | | |
|---|---|---|---|
| EP | 1 357 465 | A2 | 2/2003 |
| EP | 1 517 230 | A2 | 2/2004 |
| JP | 10-283272 | | 4/1997 |
| JP | 2004-220450 | | 1/2003 |
| JP | 2005-092424 | | 9/2003 |
| WO | WO 01/41362 | A2 | 6/2001 |

* cited by examiner

| T1 VOLUME MANAGEMENT TABLE (MAPPING TABLE) | | | | | | |
|---|---|---|---|---|---|---|
| VOLUME # | SIZE | VDEV # | SIZE | DEVICE TYPE | APPARATUS # | ADDRESS INFORMATION |
| #1 | 10000 | #1 | 50000 | FC | #1 | DRIVE NUMBER LIST |
| #2 | 30000 | | | | | |
| #3 | 40000 | #2 | 40000 | SATA | #2 | LUN,WWN |
| #4 | 50000 | #3 | 50000 | SCSI | #3 | LUN,WWN |
| --- | --- | --- | --- | --- | --- | --- |

| FUNCTION MANAGEMENT TABLE | |
|---|---|
| APPARATUS # | SUPPORTED FUNCTIONS |
| #1 | LOCAL VOLUME COPY |
| | ASYNCHRONOUS REMOTE COPY |
| | SNAPSHOT |
| | ENCRYPTION |
| | COMPRESSION |
| #2 | LOCAL REMOTE COPY |
| | SYNCHRONOUS REMOTE COPY |
| | COMPRESSION |
| | ENCRYPTION |
| #3 | LOCAL VOLUME COPY |
| | COMPRESSION |
| --- | --- |

FIG. 7

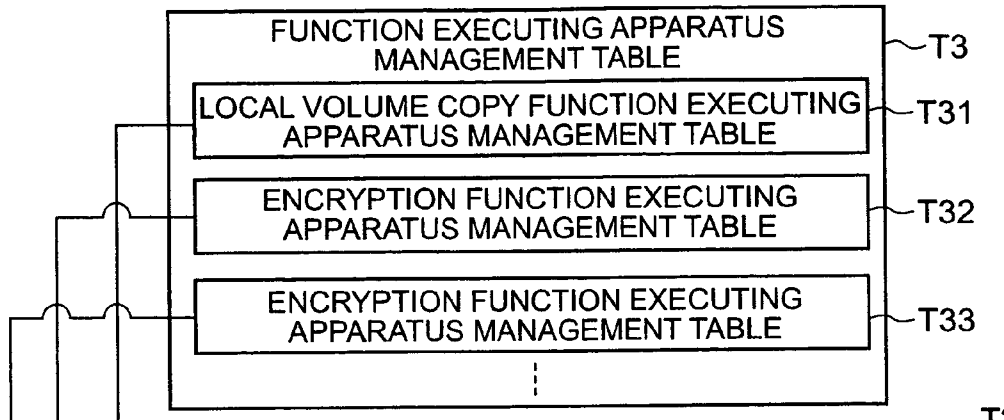

T31

LOCAL VOLUME COPY FUNCTION EXECUTING APPARATUS MANAGEMENT TABLE

| COPY SOURCE VOLUME # | COPY DESTINATION VOLUME # | EXECUTING APPARATUS # | EXECUTION CONDITIONS |
|---|---|---|---|
| #2 | #3 | #2 | NONE |
| #4 | #7 | #2,#3 (SYNCHRONOUS REMOTE COPY) | NONE |

T32

ENCRYPTION FUNCTION EXECUTING APPARATUS MANAGEMENT TABLE

| VOLUME # | EXECUTING APPARATUS # | EXECUTION CONDITIONS |
|---|---|---|
| #5 | #2 | LOAD OF APPARATUS #1 EQUAL TO OR ABOVE L1, LOAD OF APPARATUS #2 BELOW L2 |
| #8 | #2 | NONE |

T33

ENCRYPTION FUNCTION EXECUTING APPARATUS MANAGEMENT TABLE

| VOLUME # | COMPRESSED VOLUME # | EXECUTING APPARATUS # | EXECUTION CONDITIONS |
|---|---|---|---|
| #1 | #6 | #2 | LOAD OF APPARATUS #1 EQUAL TO OR ABOVE L5, LOAD OF APPARATUS #2 BELOW L6 |
| #9 | #10 | #3 | LOAD OF APPARATUS #1 EQUAL TO OR ABOVE L7, LOAD OF APPARATUS #3 BELOW L8 |

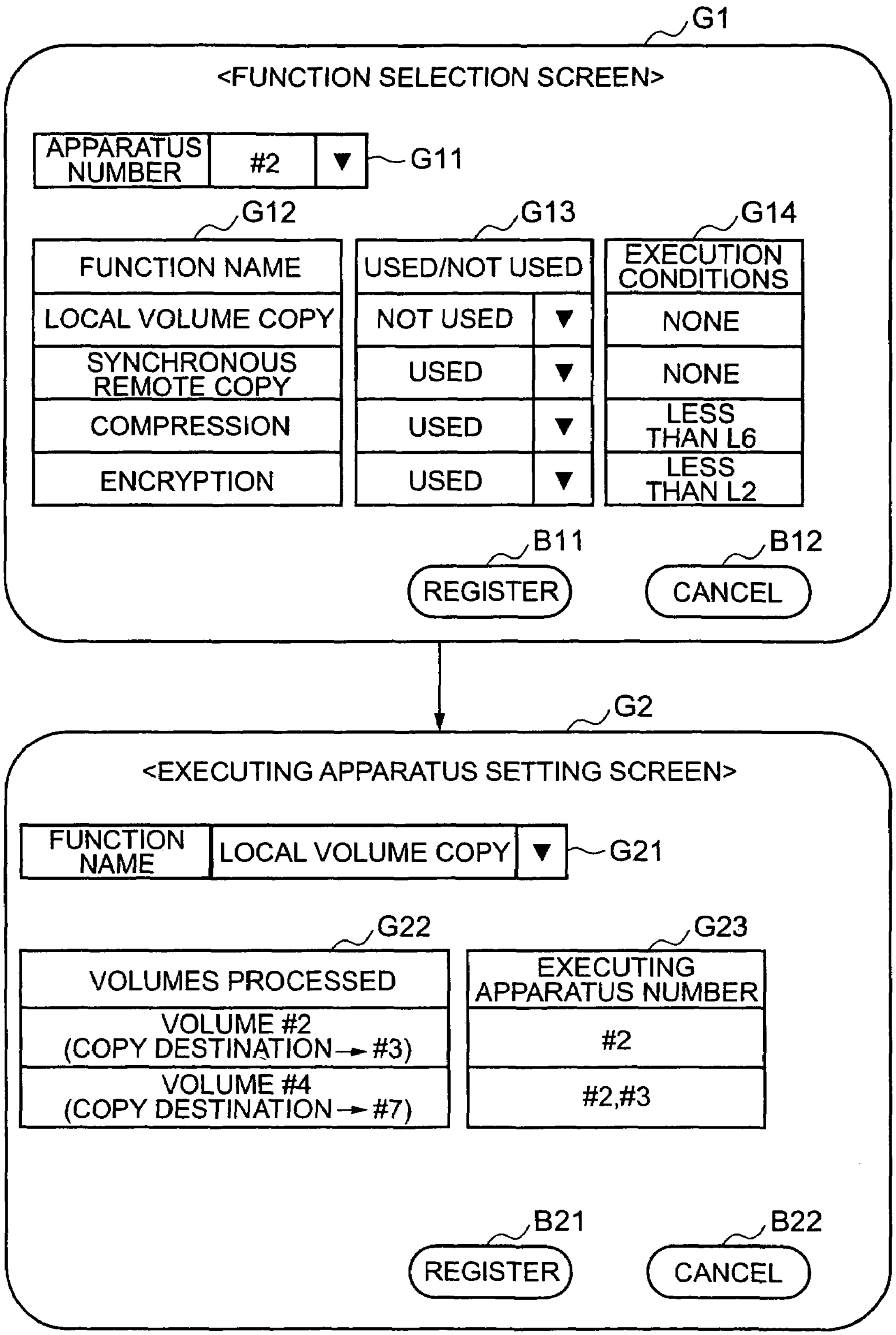

FIG. 8

<FUNCTION SELECTION SCREEN> — G1

APPARATUS NUMBER: #2 ▼ — G11

| FUNCTION NAME | USED/NOT USED | EXECUTION CONDITIONS |
|---|---|---|
| LOCAL VOLUME COPY | NOT USED ▼ | NONE |
| SYNCHRONOUS REMOTE COPY | USED ▼ | NONE |
| COMPRESSION | USED ▼ | LESS THAN L6 |
| ENCRYPTION | USED ▼ | LESS THAN L2 |

G12 / G13 / G14

(REGISTER) B11   (CANCEL) B12

<EXECUTING APPARATUS SETTING SCREEN> — G2

FUNCTION NAME: LOCAL VOLUME COPY ▼ — G21

| VOLUMES PROCESSED | EXECUTING APPARATUS NUMBER |
|---|---|
| VOLUME #2 (COPY DESTINATION → #3) | #2 |
| VOLUME #4 (COPY DESTINATION → #7) | #2, #3 |

G22 / G23

(REGISTER) B21   (CANCEL) B22

FIG. 12

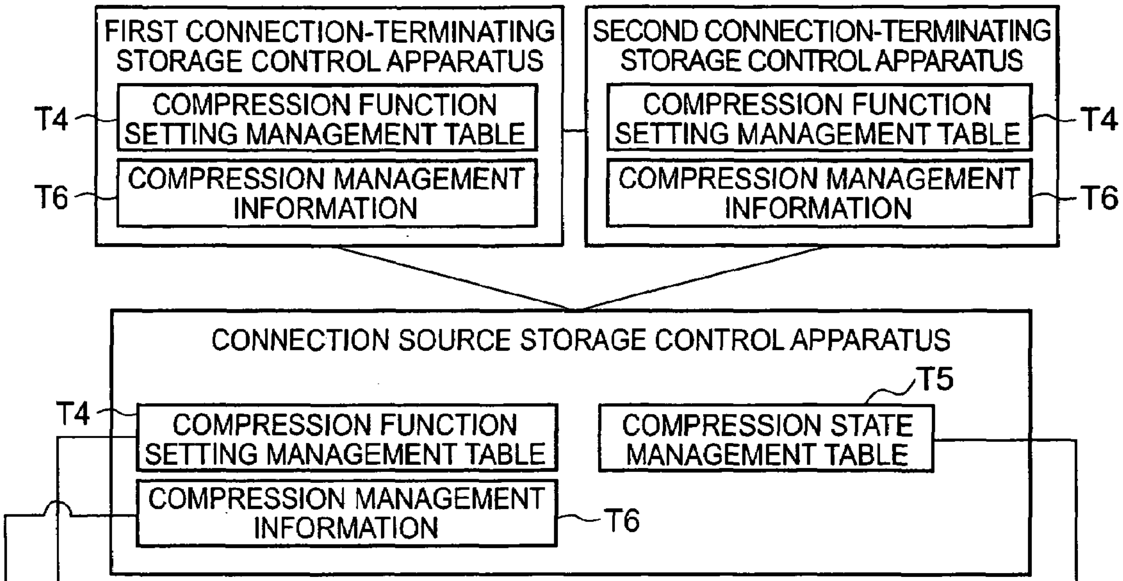

COMPRESSION FUNCTION SETTING MANAGEMENT TABLE — T4

| VOLUME # | COMPRESSION EXECUTION SETTING | EXPANSION EXECUTION SETTING | COMPRESSION ALGORITHM |
|---|---|---|---|
| #100 | COMPRESS | EXPAND | ALGORITHM 1 |
| #101 | COMPRESS | EXPAND | ALGORITHM 1 |
| #102 | COMPRESS | DO NOT EXPAND | ALGORITHM 2 |
| #103 | DO NOT COMPRESS | DO NOT EXPAND | ALGORITHM 2 |
| ---- | ---- | ---- | ---- |

T5 — COMPRESSION STATE MANAGEMENT TABLE

| VOLUME # | COMPRESSION STATE | COMPRESSION ALGORITHM |
|---|---|---|
| #110 | DO NOT COMPRESS | ALGORITHM 1 |
| #111 | COMPRESS | ALGORITHM 1 |
| #112 | COMPRESS | ALGORITHM 2 |
| #113 | DO NOT COMPRESS | ALGORITHM 2 |
| ---- | ---- | ---- |

T6 — COMPRESSION MANAGEMENT INFORMATION

| VOLUME # | ADDRESS BEFORE COMPRESSION | ADDRESS AFTER COMPRESSION | COMPRESSION ALGORITHM |
|---|---|---|---|

STORAGE SYSTEM AND STORAGE CONTROL APPARATUSES WITH COMPRESSION AND LOAD BALANCING

CROSS-REFERENCE TO RELATED APPLICATIONS

This application relates to and claims priority from Japanese Patent Application No. 2006-15894, filed on Jan. 25, 2006, the entire disclosure of which is incorporated herein by reference.

BACKGROUND OF THE INVENTION

1. Field of the Invention

The present invention relates to a storage system and to a storage control apparatus.

2. Description of the Related Art

Because the quantity of data to be managed by for example corporations, government organizations, educational institutions and other users continues to increase on a daily basis, the storage volume required by such users also increases continuously. As a result, users add new storage devices to storage control apparatuses, or introduce new storage control apparatuses having storage resources with still greater capacities.

By thus utilizing a plurality of storage control apparatuses, users intermix a plurality of storage control apparatuses within a storage system. Hence technology is provided to a higher-level apparatus by means of which, by connecting a first storage control apparatus to another storage control apparatus, storage resources within the storage system are virtualized, so that a plurality of storage control apparatuses can be utilized effectively (Japanese Patent Laid-open No. 10-283272, Japanese Patent Laid-open No. 2004-220450, Japanese Patent Laid-open No. 2005-92424).

SUMMARY OF THE INVENTION

In the prior art described in the above references, functions for virtualizing storage resources within a storage system by means of a first storage control apparatus are disclosed. In Japanese Patent Laid-open No. 2005-92424, technology is disclosed in which a second storage control apparatus is caused to execute backup processing and other heavy-load processing, so as to lighten the load on a first storage control apparatus.

However, in the case of the prior art described in the above references, there remains room for study regarding which of the storage control apparatuses within the storage system should optimally be caused to execute functions requested by the higher-level apparatus.

For example, a group of functions of a storage system can be broadly divided into common functions which can be executed by each of the storage control apparatuses, and special functions which can be executed only by prescribed storage control apparatuses. When a function the execution of which is requested by a higher-level apparatus is a common function, the function can be executed by any of the storage control apparatuses.

However, when execution of the common functions is concentrated on a certain single storage control apparatus, and a plurality of common functions are each started within the one storage control apparatus, processing performance declines. Hence the performance of the storage system as a whole with respect to the common functions declines.

Further, in the case of the prior art described in the references, each of the functions of the first storage control apparatus can be utilized, but an special function which can be executed only by a second storage control apparatus cannot be effectively utilized. This is because when a higher-level apparatus requests a function which cannot be executed by the first storage control apparatus, the first storage control apparatus may immediately return an error response.

This invention was devised in light of the above problems, and has as an object the provision of a storage system and storage control apparatus enabling appropriate distribution of a processing load among a plurality of storage control apparatuses. A further object of the invention is to provide a storage system and storage control apparatus in which, when a higher-level apparatus requests execution of an special function which can be executed only by a second storage control apparatus connected to a first storage control apparatus, the second storage control apparatus can be made to execute the special function. Further objects of the invention will become apparent from the explanations of the aspects which follow.

SUMMARY OF THE INVENTION

In order to resolve the above problems, a storage system according to this invention is provided with a first storage control apparatus which accepts requests from a higher-level apparatus, and at least one second storage control apparatus, connected to the first storage control apparatus; the first storage control apparatus can supply a higher-level apparatus a second storage area of a second storage control apparatus as a first storage area of the first storage control apparatus. Further, the storage area is provided with a state detection section, which detects the respective state of the first storage control apparatus and of the second storage control apparatuses; a function management section for managing functions which can be executed by the first storage control apparatus and by the second storage control apparatus; an executing apparatus judgment section, which, when execution of a prescribed function is requested by a higher-level apparatus, uses the state detection section and function management section to judge which storage control apparatus among the storage control apparatuses should execute the prescribed function, based on the state of the storage control apparatuses and the details of the prescribed function; and, an execution instruction section, which instructs the storage control apparatus determined by the executing apparatus judgment section to be the storage control apparatus to execute the prescribed function.

In an aspect of the invention, a function selection section is further provided to select in advance the functions which can be executed among the functions with which each of the storage control apparatuses is provided, and the function management section manages, for each of the storage control apparatuses, the functions selected by the function selection section.

In an aspect of the invention, an execution mode setting section is further provided, to set the execution mode of functions which can be executed by each of the storage control apparatuses.

In an aspect of the invention, conditions for causing the execution of a function are set in advance for each of the executable functions of each of the storage control apparatuses, and the executing apparatus judgment section judges which storage control apparatus among the storage control apparatuses should execute a prescribed function based on the state of each storage control apparatus and the conditions associated in advance with the prescribed function.

In an aspect of the invention, a condition is set such that, when the load of the first storage control apparatus is equal to or greater than a first threshold set in advance, the prescribed function is set to be executed by a second storage control apparatus.

In an aspect of the invention, a condition is set such that, when the load of a second storage control apparatus is less than a second threshold set in advance, the prescribed function is set to be executed by the second storage control apparatus.

In an aspect of the invention, a condition is set such that, when the load of the first storage control apparatus is equal to or greater than a first threshold set in advance, and moreover the load of a second storage control apparatus is less than a second threshold set in advance, the prescribed function is set to be executed by the second storage control apparatus.

In an aspect of the invention, functions which can be executed by the first storage control apparatus and by the second storage control apparatuses can be divided into common functions which can be executed by each of storage control apparatuses and special functions which can be executed by only one among the storage control apparatuses, and for each common function, a setting can be set indicating which storage control apparatus among the storage control apparatuses is to execute the function.

In an aspect of the invention, functions which can be executed by the first storage control apparatus and by the second storage control apparatuses can be divided into common functions which can be executed by each of storage control apparatuses and special functions which can be executed by only one among the storage control apparatuses, and the executing apparatus judgment section (1) causes execution of common functions, which the first storage control apparatus can execute common functions, and causes second storage control apparatuses to execute common functions based on the state of the second storage control apparatuses, when the first storage control apparatus cannot execute common functions, and (2) causes execution of special functions by second storage control apparatuses, based on the state of the second storage control apparatuses.

In an aspect of the invention, a prescribed function is a function which is accompanied by data conversion; the first storage control apparatus and second storage control apparatus are capable of executing prescribed functions, and when the first storage control apparatus executes a prescribed function, execution of the prescribed function by the first storage control apparatus is set to valid and execution of the prescribed function by the second storage control apparatus is set to invalid, and when the second storage control apparatus executes a prescribed function, execution of the prescribed function by the first storage control apparatus is set to invalid and execution of the prescribed function by the second storage control apparatus is set to valid.

In an aspect of the invention, a function which is accompanied by data conversion can comprise at least one of compression and encryption.

In an aspect of the invention, a higher-level apparatus requests execution of a prescribed function to a first storage area, and when a second storage control apparatus is determined to be the executing apparatus by the executing storage control apparatus judgment section, the execution instruction section issues an execution instruction to cause execution of the prescribed function to a second storage area.

In an aspect of the invention, a plurality of second storage control apparatuses are each connected to the first storage control apparatus so as to enable communication, and moreover each of the second storage control apparatuses are interconnected so as to enable communication; the execution instruction section issues an execution instruction to a second storage control apparatus determined to be the executing storage control apparatus by the executing apparatus judgment section from among the plurality of second storage control apparatuses, to cause execution of a prescribed function; and the execution instruction thus issued is transmitted via second storage control apparatus not selected as the executing storage control apparatus by the executing apparatus judgment section, to the second storage control apparatus determined to be the executing storage control apparatus.

Here, in this aspect of the invention, the prescribed function conveyed via the second storage control apparatuses can comprise at least one among data copying within a second storage area, and a storage device power management function of a second storage area.

A storage control apparatus according to another perspective of the invention is a storage control apparatus which is connected so as to enable communication with a higher-level apparatus which requests execution of prescribed functions and a second storage control apparatus, a second storage area of the second storage control apparatus being able to be provided in virtual form to the higher-level apparatus as a first storage area of the storage control apparatus itself, and the storage control apparatus comprises a state detection section, which detects the state of the storage control apparatus itself and of the second storage control apparatus; a function management section for managing functions which can be executed by the storage control apparatus itself and by the second storage control apparatus; an executing apparatus judgment section, which, when execution of a prescribed function is requested by a higher-level apparatus, uses the state detection section and function management section to judge whether the storage control apparatus itself or the second storage control apparatus should execute the prescribed function, based on the state of the storage control apparatus itself and the second storage control apparatus and on the details of the prescribed function; and, an execution instruction section, which instructs the storage control apparatus determined by the executing apparatus judgment section to be the storage control apparatus to execute the prescribed function.

A storage system according to still a different perspective of the invention comprises a first storage control apparatus which accepts requests from a higher-level apparatus and a plurality of second storage control apparatuses, connected with the first storage control apparatus so as to enable communication; the first storage control apparatus comprises at least a first controller, and each of the second storage control apparatuses comprises a second controller to execute specified functions and a plurality of storage devices.

The first controller provides logical volumes, created on an intermediate storage device, to a higher-level apparatus by associating one or a plurality of intermediate storage devices, provided in virtual form within the first storage control apparatus, with physical storage areas provided by storage devices of the second storage control apparatuses. The first controller comprises a volume management table, which manages the relations between logical volumes, and intermediate storage devices and the storage devices of each of the second storage control apparatuses; a function management table, in which are registered functions which can be executed by the first storage control apparatus and by each of the second storage control apparatuses; a function executing apparatus management table, which sets in advance, for the group of functions which can be executed by any of the second storage control apparatuses among the functions registered in the function management table, which of the second storage control apparatuses is to be caused to execute each function; a state detection section, which detects the load state of the first storage control apparatus and of the second storage control apparatuses; an executing apparatus judgment section, which, when execution of a prescribed function has been requested by a higher-level apparatus, uses the state detection section, the function management table, and the function executing apparatus management table to judge which storage control apparatus among the first storage control apparatus and the second storage control apparatuses should execute the prescribed function, based on the state of the first storage control apparatus and second storage control apparatuses and on the details of the prescribed function; and, an execution instruction section, which instructs the first controller or second controller of the storage control apparatus determined to be the executing storage control apparatus by the executing apparatus judgment section to execute the prescribed function.

At least a portion of the means and portions of this invention can in some cases be executed by a computer program. This computer program can be distributed in fixed form on various recording media, or can be transmitted over communication media.

BRIEF DESCRIPTION OF THE DRAWINGS

FIG. 5 is an explanatory diagram showing a volume management table;

FIG. 6 is an explanatory diagram showing a function management table;

FIG. 7 is an explanatory diagram showing a function executing apparatus management table;

FIG. 8 is a user interface explanatory diagram showing a window for function selection and a window to set the executing storage control apparatus;

FIG. 12 is an explanatory diagram showing the contents of tables used when employing a compression function and where each table is held;

DESCRIPTION OF THE PREFERRED EMBODIMENTS

Figure 1:
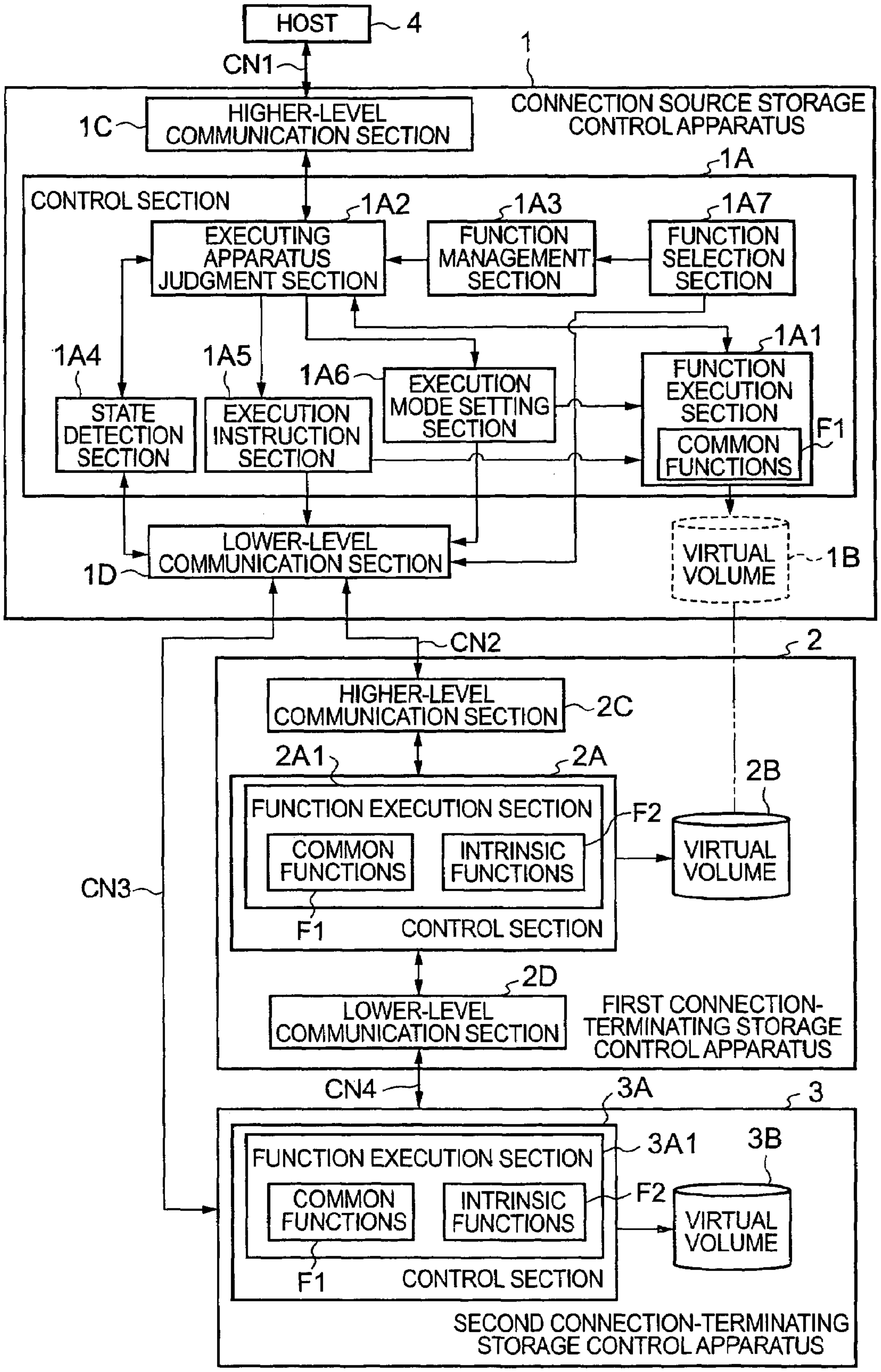
FIG. 1 is an explanatory diagram showing the overall concept of the storage system of an aspect of the invention.

Below, aspects of the invention are explained using the drawings. FIG. 1 is an explanatory diagram showing the overall configuration of the storage system of an aspect. This storage system can be configured using for example one connection source storage control apparatus 1 and one or more connection destination storage control apparatuses 2, 3.

Here, the connection source storage control apparatus 1 corresponds to the "first storage control apparatus". The first connection destination storage control apparatus 2 and the second connection destination storage control apparatus 3 correspond to the "second storage control apparatuses". The host computer (hereafter "host") 4 corresponds to the "higher-level apparatus". The virtual volume 1B of the connection source storage control apparatus 1 corresponds to the "first storage area". And, the real volumes 2B, 3B of the connection destination storage control apparatuses 2, 3 correspond to "second storage areas".

The connection source storage control apparatus 1 accepts and processes various requests from the host 4, and returns the results thereof. A plurality of the connection-destination storage control apparatuses 2, 3 are connected to the connection-source storage control apparatus 1. The connection source storage control apparatus 1 provides the host 4 with the real volumes 2B and 3B of the connection destination storage control apparatuses 2, 3 as if these volumes were the apparatus' own volume 1B. The connection source storage control apparatus 1 executes data processing (functions) requested by the host 4, and returns the results thereof to the host 4. In this way, the connection source storage control apparatus 1 serves as an interface representing the storage system, in a storage system in which a plurality of storage control apparatuses 1, 2, 3 are intermixed.

The configuration of the connection source storage control apparatus 1 is explained. The connection source storage control apparatus 1 can comprise, for example, a control section 1A, a virtual volume 1B, a higher-level communication section 1C, and a lower-level communication section 1D. The higher-level communication section 1C and lower-level communication section 1D are placed outside the control section 1A, but the communication sections 1C, 1D may be provided within the control section 1A.

As stated below, the connection source storage control apparatus 1 need not comprise a physical storage area for storage of user data. Hence the connection source storage control apparatus 1 can be configured as a disk array subsystem, or can be configured as a network switch.

The higher-level communication section 1C is connected to the host 4 via the communication network CN1, and performs bidirectional data communication with the host 4. As the communication network CN1, for example, a LAN (Local Area Network) or SAN (Storage Area Network) or similar can be used. That is, the higher-level communication section 1C and host 4 can perform data communication using TCP/IP (Transmission Control Protocol/Internet Protocol) and FCP (Fibre Channel Protocol).

The lower-level communication section 1D is connected to the first connection destination storage control apparatus 2 via the communication network CN2. The lower-level communication section 1D is also connected to the second connection destination storage control apparatus 3 via the communication network CN3. As the communication networks CN2 and CN3, for example, a LAN, SAN or similar can be used. The communication networks CN1, CN2, CN3 can be configured as the same network.

The virtual volume 1B is a logical storage device used by the host 4, and is also called a logical volume. In the following explanation, the virtual volume 1B may be called a logical volume 1B. Data (user data) utilized by the host 4 is stored in the virtual volume 1B. However, the virtual volume 1B is not provided with a physical entity. The user data is actually stored by the real volume 2B of the first connection destination storage control apparatus 2.

By mapping the real volume 2B to a virtual volume 1B, the address space of the virtual volume 1B is associated with the address space of the real volume 2B. When the host 4 specifies a prescribed address of the virtual volume 1B and transmits write data, the write data is transferred to the first connection destination storage control apparatus 2, and is written to the address in the real volume 2B associated with the prescribed address. When the host 4 specifies the prescribed address in the virtual volume 1B and requests data reading, data is read from the address in the real volume 2B associated with the prescribed address and is transmitted from the first connection destination storage control apparatus 2 to the connection source storage control apparatus 1. The connection source storage control apparatus 1 transmits the data received from the first connection destination storage control apparatus 2 to the host 4.

In this way, the host 4 can read data from and write data to the virtual volume 1B without at all being aware of the location in the storage system of the physical entity of the virtual volume 1B. The function in which, by associating the real volume 2B of the connection destination storage control apparatus 2 with the virtual volume 1B of the connection source storage control apparatus 1, the real volume 2B, existing outside the connection source storage control apparatus 1 can be provided to the host 4 as a logical volume within the connection source storage control apparatus 1, is in this specification called an external connection function.

The configuration of the control section 1A is explained. In addition to the above-described external connection function, the control section 1A can for example be provided with a function execution section 1A1, executing apparatus judgment section 1A2, function management section 1A3, state detection section 1A4, execution instruction section 1A5, execution mode setting section 1A6, and function selection section 1A7.

The function execution section 1A1 executes functions requested by the host 4. Here, a function may for example be a local volume copy function, remote copy function, snapshot function, encryption (including decryption) function, compression (including expansion) function, or similar.

A local volume copy function is a function to copy either all of or a portion of the data from a copy source volume to a copy destination volume, when both the copy source volume and the copy destination volume exist within the same subsystem. Hence the local volume copy function is sometimes also called an intra-subsystem volume copy function.

A remote copy function is a function to copy either all of or a portion of the data from a copy source volume to a copy destination volume, when the copy source volume and the copy destination volume exist in different subsystems. The remote copy function can also be called an inter-subsystem volume copy function. The remote copy function can also be broadly divided into a synchronous remote copy function and an asynchronous remote copy function. The synchronous remote copy function is a function in which, after confirming completion of write processing at the data transfer destination (the storage control apparatus having the copy destination volume) in response to a write request from the higher-level apparatus to the copy source volume, a write completion response is issued to the higher-level apparatus. The asynchronous remote copy function is a function in which, in response to a write request to the copy source volume from the higher-level apparatus, a write completion response is issued to the higher-level apparatus, without confirming the completion of write processing at the data transfer destination.

A snapshot function is a function in which a static storage image of a logical volume 1B at a specified prescribed point in time is created. The snapshot function may be realized by a method of using the volume copy function to create and save a synchronous volume, or by a method of saving (copying) old data in an area for writing to another area when a write request from the higher-level apparatus has occurred and then writing the new data, or by a method of writing new data to another area when there is a write request to a static area from the higher-level apparatus.

A migration function is a function in which all or a portion of a specified prescribed logical volume 1B is moved to another logical volume 1B, without changing the host access path. Methods of realizing the migration function include a method of using a volume copy function or similar to create a synchronized volume and then changing data access by the host from the movement source to the movement destination, and a method of first changing the access to the movement destination, and then copying data from the movement source to the movement destination in order.

An encryption function is a function for encrypting data based on a prescribed encryption algorithm, and for decrypting encrypted data. A compression function is a function for performing data compression based on a compression algorithm, and for expanding compressed data.

The function execution section 1A1 executes all of or a portion of the above-described functions. Of the above functions, those functions provided in common to the connection source storage control apparatus 1 and to each of the connection destination storage control apparatuses 2, 3 are called common functions F1, and functions other than common functions F1 can be called special functions F2. In the example shown in FIG. 1, the connection source storage control apparatus 1 can execute only common functions F1, and each of the connection destination storage control apparatuses 2, 3 can execute common functions F1 and special functions F2. Hence special functions F2 can also be called functions which can be executed only by connection destination storage control apparatuses 2, 3.

The executing apparatus judgment section 1A2 judges which of the storage control apparatuses 1, 2, 3 should execute a function the execution of which has been requested by the host 4. The executing apparatus judgment section 1A2 uses the function management section 1A3 and state detection section 1A4 to select one storage control apparatus which is to execute the function requested by the host 4.

The function management section 1A3 manages functions which can be executed (used by) each of the storage control apparatuses 1, 2, 3. The function selection section 1A7 selects which of the functions can be executed among the plurality of functions of each of the storage control apparatuses 1, 2, 3. In other words, the function management section 1A3 manages functions selected for each of the storage control apparatuses 1, 2, 3 by the function selection section 1A7. Hence the executing apparatus judgment section 1A2 uses the function management section 1A3 to ascertain which storage control apparatus can execute which functions.

The state detection section 1A4 detects the state of each of the storage control apparatuses 1, 2, 3. State may be, for example, the load state of the storage control apparatuses 1, 2, 3. Parameters used to detect load state may be, for example, the number of data input/output requests per unit time (IOPS), the CPU (Central Processing Unit) usage rate, the cache memory usage rate, and similar. A plurality of such parameters can be combined to judge the load state. The state of a storage control apparatus is not limited to the load state; for example, whether the storage control apparatuses 1, 2, 3 is in operation, or similar information can be used. This is because when an apparatus is halted for maintenance operations or similar, a function requested by the host 4 cannot be executed even when the storage control apparatus is selected.

The executing apparatus judgment section 1A2 can use the state detection section 1A4 to ascertain the state of each of the storage control apparatuses 1, 2, 3. The executing apparatus judgment section 1A2 selects the apparatus for execution of a function the execution of which has been requested, based on which of the storage control apparatuses 1, 2, 3 is capable of executing the function execution of which has been requested by the host 4, and based on the current state of the storage control apparatuses 1, 2, 3.

The execution instruction section 1A5 issues an instruction to a storage control apparatus selected by the executing apparatus judgment section 1A2, to cause execution of a function execution of which has been requested by the host 4. If the connection source storage control apparatus 1 is selected as the executing apparatus, the execution instruction section 1A5 provides the execution instruction to the function execution section 1A1. If either of the connection destination storage control apparatuses 2, 3 is selected as the executing apparatus, the execution instruction section 1A5 provides the execution instruction to the selected connection destination storage control apparatus 2 or 3.

The execution mode setting section 1A6 sets the execution mode for an executable function. When a certain function has a plurality of execution modes, and switching between the execution modes is possible, the execution mode setting section 1A6 sets which one among the execution modes is to be selected. For example, in the case of a compression function which can be switched between a compression mode to compress data and an expansion mode to expand data during execution, the execution mode setting section 1A6 selects one of these execution modes. Similarly in the case of an encryption function which can be switched between an encryption mode to encrypt data and a decryption mode to decrypt encrypted data during execution, the execution mode setting section 1A6 selects one of these modes.

Next, the configuration of the first connection destination storage control apparatus 2 is explained. The first connection destination storage control apparatus 2 provides a physical storage area to the connection source storage control apparatus 1. Hence the first connection destination storage control apparatus 2 comprises a control section 2A, real volume 2B, and higher-level communication section 2C. Further, the first connection destination storage control apparatus 2 can operate linked with the second connection destination storage control apparatus 3. For this purpose, the first connection destination storage control apparatus 2 comprises a lower-level communication section 2D. The first connection destination storage control apparatus 2 is for example configured as a disk array subsystem.

The control section 2A controls operation of the first connection destination storage control apparatus 2, and comprises a function execution section 2A1. The function execution section 2A1 can execute common functions F1 and special functions F2, and executes specified functions.

The real volume 2B is a logical storage device (logical volume) linked to a physical entity for storage of data. In this specification, a logical volume linked to a physical entity may be called a real volume, and a logical volume indirectly linked to a physical entity may be called a virtual volume. More specifically, the physical storage areas of each of a plurality of storage devices such as hard disk drives are combined and virtualized, and a real volume is created on the storage area of this virtualized physical storage device (also called an intermediate storage device).

The higher-level communication section 2C is connected to the connection source storage control apparatus 1 via the communication network CN2, and performs bidirectional data communication with the connection source storage control apparatus 1. The lower-level communication section 2D is connected to the second connection destination storage control apparatus 3 via the communication network CN4, and performs bidirectional data communication with the second connection destination storage control apparatus 3. As the communication network CN4, a SAN, LAN, or similar can be used. The communication network CN4 and the communication networks CN1, CN2, CN3 can be configured as the same network.

The second connection destination storage control apparatus 3, similarly to the first connection destination storage control apparatus 2, provides a physical storage area to the connection source storage control apparatus 1. Hence the second connection destination storage control apparatus 3, similarly to the first connection destination storage control apparatus 2, can for example be configured as a disk array subsystem having a control section 3A and real volume 3B. Due to limitations of space, the configuration of the communication portion is omitted, but the second connection destination storage control apparatus 3 also has a higher-level communication portion. When connecting still another storage control apparatus downstream from the second connection destination storage control apparatus 3, the second connection destination storage control apparatus 3 is provided with a lower-level communication portion.

The control section 3A controls operation of the second connection destination storage control apparatus 3, and comprises a function execution section 3A1. The function execution section 3A1 can execute common functions F1 and special functions F2, and executes specified functions. The real volume 3B can be associated with a virtual volume 1B of the connection source storage control apparatus 1. An external connection function can also be provided in the first connection destination storage control apparatus 2, and a real volume 3B of the second connection destination storage control apparatus 3 associated with a virtual volume within the first connection destination storage control apparatus 2, as in an embodiment explained below.

Next, operation of the storage system is explained. Data read processing and write processing by an external connection function has already been discussed and so is omitted. The host 4 issues a request to the connection source storage control apparatus 1 for execution of a prescribed function other than a read request or a write request (a volume copy function, compression function, or similar). This execution request comprises information to identify the volume to which the prescribed function is to be applied.

The executing apparatus judgment section 1A2, upon receiving the execution request from the host 4, uses the function management section 1A3 and state detection section 1A4 to decide which of the storage control apparatuses 1, 2, 3 should be made to execute the function execution of which has been requested.

Execution conditions can be set in advance for all or a portion of the plurality of functions managed by the function management section 1A3. Conditions can be, for example, "cause a connection destination storage control apparatus to perform execution when the load on the connection source storage control apparatus is high"; "when the load on a connection destination storage control apparatus is low, have that connection destination storage control apparatus perform proxy processing"; and "when the load on the connection source storage control apparatus is high, and moreover the load on a connection destination storage control apparatus is low, have that connection destination storage control apparatus execute the function".

The executing apparatus judgment section 1A2 confirms that the prescribed function execution of which has been requested can be executed by any of the storage control apparatuses 1, 2 or 3, and judges whether the current state of storage control apparatuses capable of execution satisfy the execution conditions. The executing apparatus judgment section 1A2 then selects a storage control apparatus satisfying the execution conditions as the executing apparatus.

The execution instruction section 1A5 issues an instruction to execute the prescribed function to the function execution section 1A1, 2A1, or 3A1 of the storage control apparatus selected as the executing apparatus. The execution instruction section 1A5 issues the execution instruction either with the execution request from the host 4 unmodified, or with the execution request form the host 4 converted into another execution request.

For example, suppose that the connection source storage control apparatus 1 has two virtual volumes 1B, and that one virtual volume 1B is associated with the real volume 2B of the first connection destination storage control apparatus 2, while the other virtual volume 1B is associated with the real volume 3B of the second connection destination storage control apparatus 3. With this configuration, suppose that the host 4 requests execution of data copying from one virtual volume 1B to the other virtual volume 1B.

When the connection source storage control apparatus 1 is selected as the executing apparatus, the execution instruction section 1A5 issues an instruction to the function execution section 1A1 to execute the local volume copy function. The function execution section 1A1 writes data read from one of the virtual volumes 1B to the other virtual volume 1B by executing the local volume copy function.

When the first connection destination storage control apparatus 2 is selected as the executing apparatus, the execution instruction section 1A5 issues an instruction to the function execution section 2A1 to execute the remote copy function. The function execution section 2A1 transmits data read from the real volume 2B to the second connection destination storage control apparatus 3 and causes the data to be stored in the real volume 3B by means of the remove copy function.

In this way, the execution instruction section 1A5 can convert execution requests from the host 4, based on the details of the storage control apparatus selected as the executing apparatus and details of the prescribed function (the details of processing expected by the host 4), so as to obtain the execution result desired by the host 4.

By means of the above-described configuration, this aspect has the following advantageous results. First, in this aspect the storage control apparatus which is to execute the prescribed function is selected based on the details of the prescribed function execution of which has been requested by the host 4, and based on the state of the storage control apparatuses 1, 2, 3. Hence increases in the processing load of a specific storage control apparatus can be suppressed, and loads can be distributed more appropriately within the storage system.

Second, when in this aspect the host 4 requests execution of an special function F2 which can be executed only by the connection destination storage control apparatuses 2 and 3, the appropriate executing apparatus is selected and caused to execute the function according to the state of the connection destination storage control apparatuses 2, 3. Hence even in the case of a function with which the connection source storage control apparatus 1 is not provided, if the function F2 can be executed by the connection destination storage control apparatuses 2, 3, the function F2 can be caused to be executed. By this means, functions F2 which can be executed only by the connection destination storage control apparatuses 2, 3 can be effectively utilized, and the connection source storage control apparatus 1 can appear to be executing the function, even when the function F2 is not actually installed in the connection source storage control apparatus 1.

In order to use a function F2 which is not installed in the connection source storage control apparatus 1, but is installed only in the connection destination storage control apparatuses 2, 3, an interface to receive instructions for execution of the function F2 is necessary. This interface to receive instructions to execute a function which is not installed can for example be provided in the higher-level communication section 1C. As the method of installation of such an interface, for example, a method of installation of a common interface recommended by a standardization body or similar, or a method of associating in peculiar read commands and write commands for a specific address in a special logical device with instructions for execution of the function F2 in the connection destination storage control apparatuses 2, 3, or a method of defining the function in advance as a vendor-specific command, or a method of re-installing in the connection source storage control apparatus 1 an interface used by the connection destination storage control apparatuses 2 and 3, can be employed.

Focusing on the above-described second advantageous result, this aspect can for example be expressed as "a storage system, comprising a first storage control apparatus (1) which accepts requests from a higher-level apparatus (4) and one or more second storage control apparatuses (2, 3)connected to the first storage control apparatus to enable communication, and wherein the first storage control apparatus can provide to the higher-level apparatus a second storage area (2B) of the second storage control apparatuses as a first storage area (1B) of the first storage control apparatus; and further comprising:

a reception section (1C) which, when a request for execution of a function (F2) which is installed only on a second storage control apparatus is issued from the higher-level apparatus, receives the execution instruction;

a function management section (1A3) to manage functions which can be executed by the first storage control apparatus and by the second storage control apparatuses;

an executing apparatus judgment section (1A2), which, when execution of a prescribed function (F2) has been requested by the higher-level apparatus via the reception section, selects a second storage control apparatus capable of executing the prescribed function by using the function management section; and, an execution instruction section, which issues an instruction for execution of a prescribed function to the connection destination storage control apparatus selected as the executing apparatus by the executing apparatus judgment section".

Instructions from the host 4 to the storage control apparatus 1 and instructions from the storage control apparatus 1 to the storage control apparatuses 2, 3 can employ the so-called in-band method or out-of-band method. That is, instructions can be provided via a data input/output network (in-band method), or instructions can be provided via a management network (out-of-band method). Hereafter, this aspect is explained in greater detail.

Embodiment 1

Figure 2:
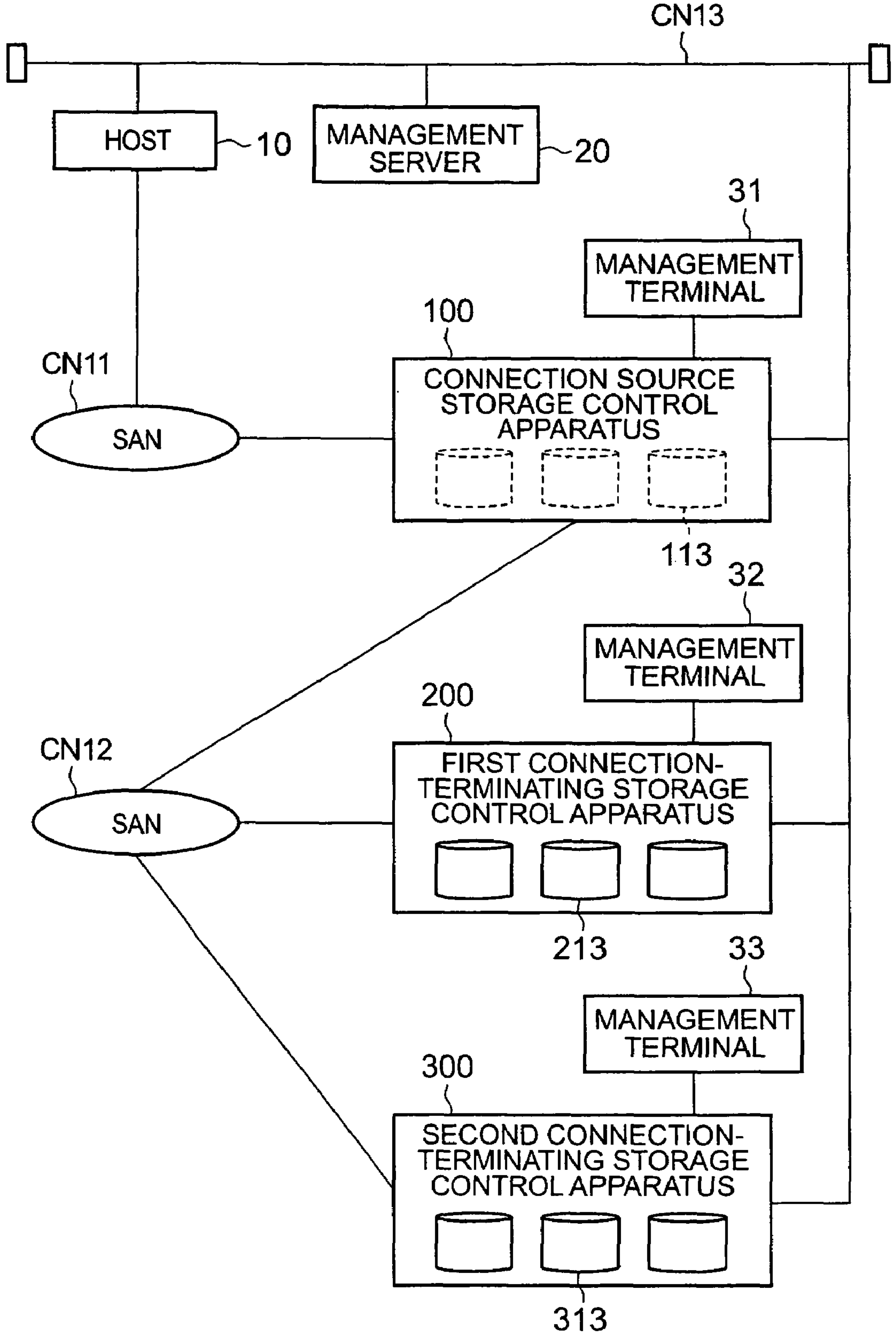
FIG. 2 is an explanatory diagram showing the overall configuration of a storage system.

FIG. 2 is an explanatory diagram showing the overall configuration of the storage system of this embodiment. This storage system can be configured to comprise, for example, one connection source storage control apparatus 100, a plurality of connection destination storage control apparatuses 200, one or a plurality of hosts 10, and one or a plurality of management servers 20.

The correspondence between the configuration shown in FIG. 2 and that shown in FIG. 1 is as follows. The connection source storage control apparatus 100 corresponds to the connection source storage control apparatus 1 in FIG. 1; the first connection destination storage control apparatus 200 corresponds to the first connection destination storage control apparatus 2 shown in FIG. 1; the second connection destination storage control apparatus 300 corresponds to the second connection destination storage control apparatus 3 shown in FIG. 1; and the host 10 corresponds to the host 4 in FIG. 1. The virtual volume 113 corresponds to the virtual volume 1B in FIG. 1, and the real volumes 213, 313 correspond to the real volumes 2B, 3B in FIG. 1.

The connection source storage control apparatus 100 is an apparatus which represents the connection destination storage control apparatuses 200, 300 to accept various commands from the host 10. The connection destination storage control apparatuses 200, 300 provide real volumes 213, 313 to the connection source storage control apparatus 100. Details of the storage control apparatuses 100, 200, 300 are explained below.

The host 10 is a computer apparatus which is for example configured as a personal computer, workstation, mainframe, or similar. The host 10 can for example be provided with a program to manage a RAID (Redundant Array of Independent Disks), a program to manage paths, and various application programs.

The host 10 accesses the volume 113 of the connection source storage control apparatus 100 and performs data reading and writing. The management server 20 is connected to the host 10 and to the storage control apparatuses 100, 200, 300 via a communication network for management CN13.

The management server 20 manages the state of each host 10 and of each of the storage control apparatuses 100, 200, 300. A LAN can for example be used as the communication network for management CN3.

The host 10 and the connection source storage control apparatus 100 are connected via a SAN, for example, or another communication network CN11. The connection source storage control apparatus 100 is connected to each of the connection destination storage control apparatuses 200, 300 via for example a SAN or another communication network CN12.

Here, a SAN may be an FC_SAN using FCP, or may be an IP_SAN using IP (the Internet Protocol). Also, CN11 and CN12 can be configured as separate SANs, as for example when the network CN11 is an FC_SAN and the network CN12 is an IP_SAN. Also, CN11 and CN12 can be integrated, and a common network can be used to connect the host 10 to the storage control apparatuses 100, 200, 300 and to connect the storage control apparatuses 100, 200, 300 to each other.

Figure 3:
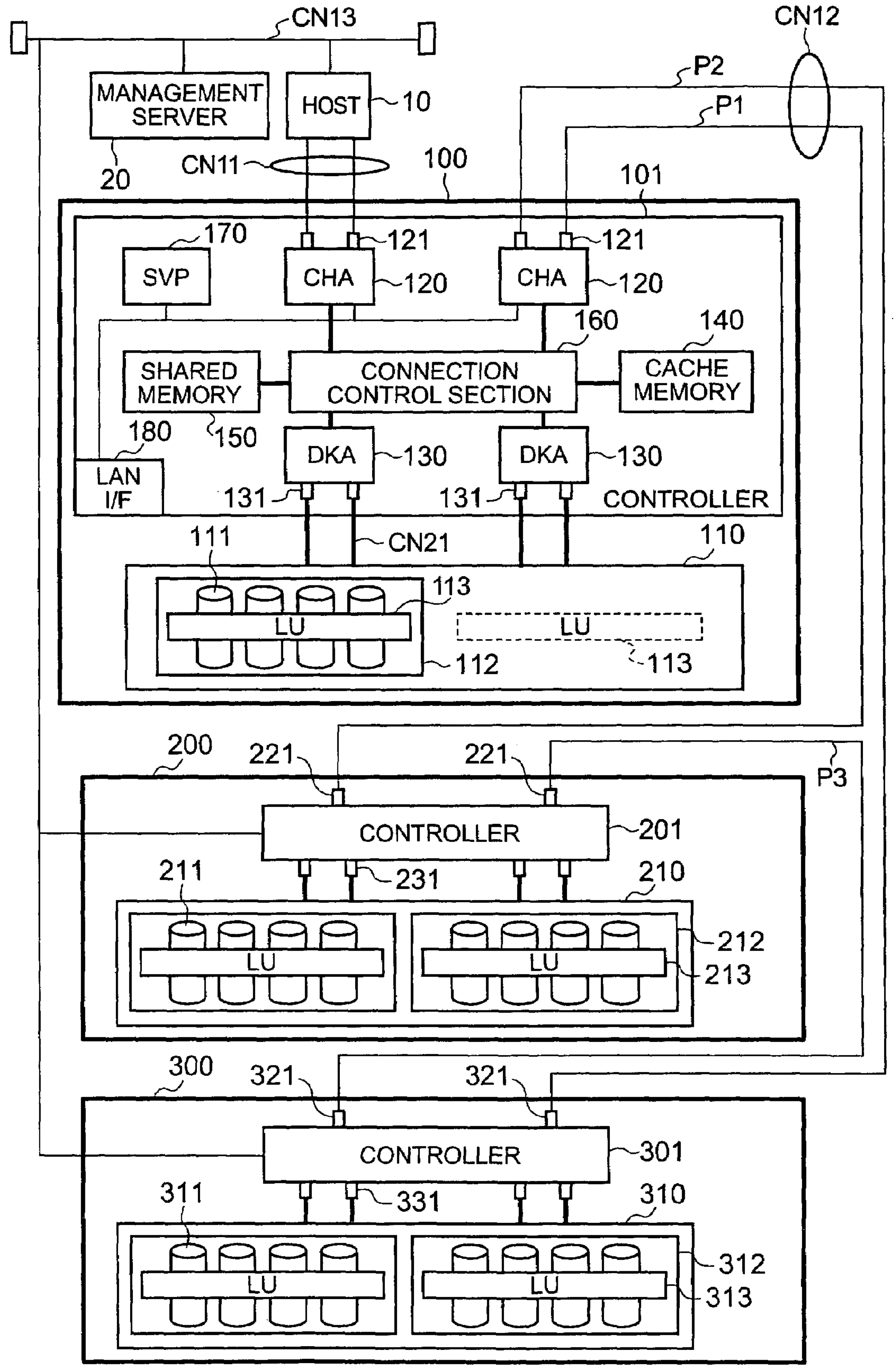
FIG. 3 is an explanatory diagram showing the hardware configuration of a storage system.

FIG. 3 is an explanatory diagram showing the hardware configuration of the storage control apparatuses 100, 200, 300. FIG. 3 primarily shows an example of the configuration of a connection source storage control apparatus 100. The connection source storage control apparatus 100 can be configured as a disk array subsystem comprising a controller 101 and storage section 110, for example. The connection source storage control apparatus 100 can also be configured as an intermediate apparatus, such as a switching device.

The controller 101 controls operation of the connection source storage control apparatus 100. The controller 101 can be configured to comprise, for example, a plurality of channel adapters (hereafter "CHAs") 120, a plurality of disk adapters (hereafter "DKAs") 130, cache memory 140, shared memory 150, a connection control section 160, and a service processor (hereafter "SVP") 170. The configuration of the controller 101 is not limited to that shown in FIG. 3. Any configuration may be employed so long as communication functions between the host 10 and the connection destination storage control apparatuses 200, 300, as well as an external connection function, executing apparatus judgment function, and similar are realized.

The CHA 120 controls data communication with the host 10. The CHA 120 can be configured as a computer apparatus comprising, for example, a microprocessor, memory, a protocol chip, a data transfer chip, and similar. The CHA 120 comprises a plurality of communication ports 121. Each communication port 121 is allocated a network address, such as for example an IP address or a WWN (World Wide Name).

The communication ports 121 can be set as, for example, initiator ports or target ports. A communication port 121 set as a target port is connected to the host 10. A communication port 121 set as an initiator port (external connection port) is connected to the connection destination storage control apparatuses 200, 300. The host 10 and the connection source storage control apparatus 100, and the connection source storage control apparatus 100 and connection destination storage control apparatuses 200, 300, may be connected by a plurality of communication paths. By this means the communication load can be distributed, and fault tolerance can be improved.

The DKA 130 controls data communication with the storage section 110. Similarly to the CHA 120, the DKA 130 is configured as a computer apparatus comprising a microprocessor, memory and similar. The communication ports 131 of the DKA 130 are connected to the storage section 110 via the communication network CN21.

Cache memory 140 stores write data received from the host 10 and read data read from the storage section 110. Shared memory 150 stores various control information and management information necessary to control operation of the storage control apparatus 100. A plurality of cache memory units 140 may be provided, to realize redundant storage of data not written to the storage section 110 (so-called "dirty data"). Also, cache memory 140 and shared memory 150 may be configured as the same memory package. And, a portion of a certain memory unit may be used as a control memory area, and the remaining portion used as a cache memory area.

The connection control section 160 is configured as for example a crossbar switch or similar. The connection control section 160 connects each of the CHAs 120 and each of the DKAs 130 to cache memory 140 and shared memory 150.

The SAV 170 is connected to the CHAs 120 and the LAN interface 180 via internal LAN and others. The SVP 170 collects various status and other information within the storage control apparatus 100, either regularly or irregularly, and outputs warning signals, analysis results and similar based on the collected information.

In FIG. 3, although not shown due to limitations of space, the SVP 170 is connected to a management terminal 31 shown in FIG. 2. The management terminal 31 is for example configured as a personal computer, mobile computer, or similar. The management terminal 31 can ascertain the state within the storage control apparatus 100 via the SVP 170. The user can also modify settings of the storage control apparatus 100 from the management terminal 31 via the SVP 170.

The LAN interface 180 is connected to the management network CN13. The SVP 170 can also be connected to the management server 20 and host 10 via the LAN interface 180. Hence the management server 20 and host 10 can acquire information for the storage control apparatus 100 and manage the storage control apparatus 100 via the management network CN13. When managing the storage control apparatus 100 from the host 10, a management program is installed on the host 10 in advance.

The storage section 110 comprises, for example, a plurality of disk drives 111 connected in an array. The disk drives 111 are equivalent to "storage devices". The disk drives 111 can be configured as various storage devices, such as for example hard disk drives, semiconductor memory drives, optical disc drives, magneto-optical disc drives, magnetic tape drives, and similar.

In the case of hard disk drives, various types of hard disk drives can be used, such as FC (Fibre Channel) disks, SATA (Serial AT Attachment) disks, and SCSI (Small Computer System Interface) disks. Also, different storage devices can coexist within the storage section 110.

For example, a single group may be configured from a prescribed number of disk drives 111, such as four drives or eight drives. This group is called a RAID group (parity group) 112. Each of the disk drives 111 in a RAID group 112 provides a physical storage area, and an aggregate of these physical storage areas is formed. Hence a RAID group 112 can be called a physical storage device. Although there are differences depending on the RAID level, of the disk devices 111 in a group 112, one or a plurality of disk drives 111 is used to store parity data. As explained below, an intermediate storage device 112V is provided in a RAID group 112.

Either one or a plurality of logical volumes 113 can be set in the physical storage area of the RAID group 112. Logical volumes 113 are allocated to communication ports 121 of CHAs 120, and are accessed by the host 10. Logical volumes 113 may also be called logical storage devices.

Conceptually, a virtual logical volume (virtual volume) 113 is also provided within the storage section 110, as indicated by the broken line. However, the physical entity of the virtual volume 113 does not exist within the storage section 110, but exists within the connection destination storage control apparatuses 200, 300. The connection source storage control apparatus 100 can incorporate the storage resources of the connection destination storage control apparatuses 200, 300 as if these were the connection source storage control apparatus' own storage resources by means of the above-described external connection function. Hence the storage control apparatus 100 need not necessarily comprise disk drives 111, and can be configured as a network switch.

Next, the configuration of the first connection destination storage control apparatus 200 is explained. This connection destination storage control apparatus 200 can be configured as a disk array subsystem comprising a controller 201 and storage section 210, for example.

The controller 201 controls operation of the connection destination storage control apparatus 200, and so similarly to the above-described controller 101, comprises CHA functions, DKA functions, cache memory, shared memory, and similar. The controller 201 is connected to a communication port 121 of the controller 101 via the communication port 221. A communication path P1 is set between the controller 201 and the controller 101. Further, the controller 201 is connected to the storage section 210 via the communication port 231.

Similarly to the above-described storage section 110, the storage section 210 comprises a plurality of disk drives 211. A RAID group 212 is formed by a plurality of disk drives 211. A logical volume (real volume) 213 is provided in this RAID group 212.

The second connection destination storage control apparatus 300, similarly to the first connection destination storage control apparatus 200, can be configured as a disk array subsystem comprising a controller 301 and storage section 310.

The controller 301 controls operation of the connection destination storage control apparatus 300. The controller 301, similarly to the controller 201, comprises CHA functions, DKA functions, cache memory, shared memory, and similar. The controller 301 is connected to the communication port 121 of the controller 101 via the communication port 321. A communication path P2 is set between the controller 301 and the controller 101. The controller 301 is connected to the communication port 221 of the controller 201 via the communication port 321. A communication path P3 is set between the controller 301 and the controller 201.

The storage section 310, similarly to the storage section 210, comprises a plurality of disk drives 311, a RAID group 312 and a logical volume (real volume) 313.

Due to limitations of space, only two connection destination storage control apparatuses are shown; but three or more connection destination storage control apparatuses can be provided. Further, by installing an external connection function in the connection destination storage control apparatuses as well, a certain connection destination storage control apparatus can be used as a connection origin to connect to another connection destination storage control apparatus.

Here, normal read command processing and write command processing by a CHA 120 and DKA 130 are first explained. Upon receiving a read command issued by the host 10, the CHA 120 stores the read command in shared memory 150. The DKA 130 references shared memory 150 from time to time.

The DKA 130, upon discovering an unprocessed read command, converts the read address contained in the read command into a physical address of a disk drive 111, and reads data from the prescribed disk drive 111. The DKA 130 stores the data read from the disk drive 111 in cache memory 140. The CHA 120 reads the data stored in cache memory 140, and transmits the data to the host 10.

Upon receiving a write command issued by the host 10, the CHA 120 secures an area to store the write data in cache memory 140, and stores the write command in shared memory 150. Then, the CHA 120 stores the write data received from the host 10 in cache memory 140.

The DKA 130 confirms the write command stored in shared memory 150, and reads the write data from cache memory 140. The DKA 130 performs the above-described address conversion, and then stores the write data in the prescribed disk drive 111.

At the time at which the write data is stored in cache memory 140, the CHA 120 can notify the host 10 of the completion of write command processing (asynchronous processing). Or, at the time at which the DKA 130 confirms that the write data has been written to the disk drive 111, the CHA 120 can notify the host 10 of the completion of write command processing (synchronous processing).

The above is data input/output processing for a real volume of the storage control apparatus 100. Next, data input/output processing for a virtual volume is explained. A virtual volume 113 within the connection source storage control apparatus 100 is assumed to be associated with a real volume 213 within the first connection destination storage control apparatus 200.

First, when a write command for the virtual volume has been issued, the CHA 120 converts the volume identifier and address of the read command into those for the real volume 213, and transmits the read command to the connection destination storage control apparatus 200. The connection destination storage control apparatus 200 reads data from the real volume 213 according to the read command, and transmits the read-out data to the connection source storage control apparatus 100. The CHA 120, upon receiving data from the connection destination storage control apparatus 200, causes this data to be stored in cache memory 140. The CHA 120 then transmits the data stored in cache memory 140 to the host 10.

When a write command is issued for a virtual volume, the CHA 120 converts the volume identifier and address for the write command into those for the real volume 213. The CHA 120 then causes the write data received from the host 10 to be stored in cache memory 140. The CHA 120 transmits the write command and write data to the connection destination storage control apparatus 200. The connection destination storage control apparatus 200 stores the write data received from the connection source storage control apparatus 100 in the real volume 213.

Figure 4:
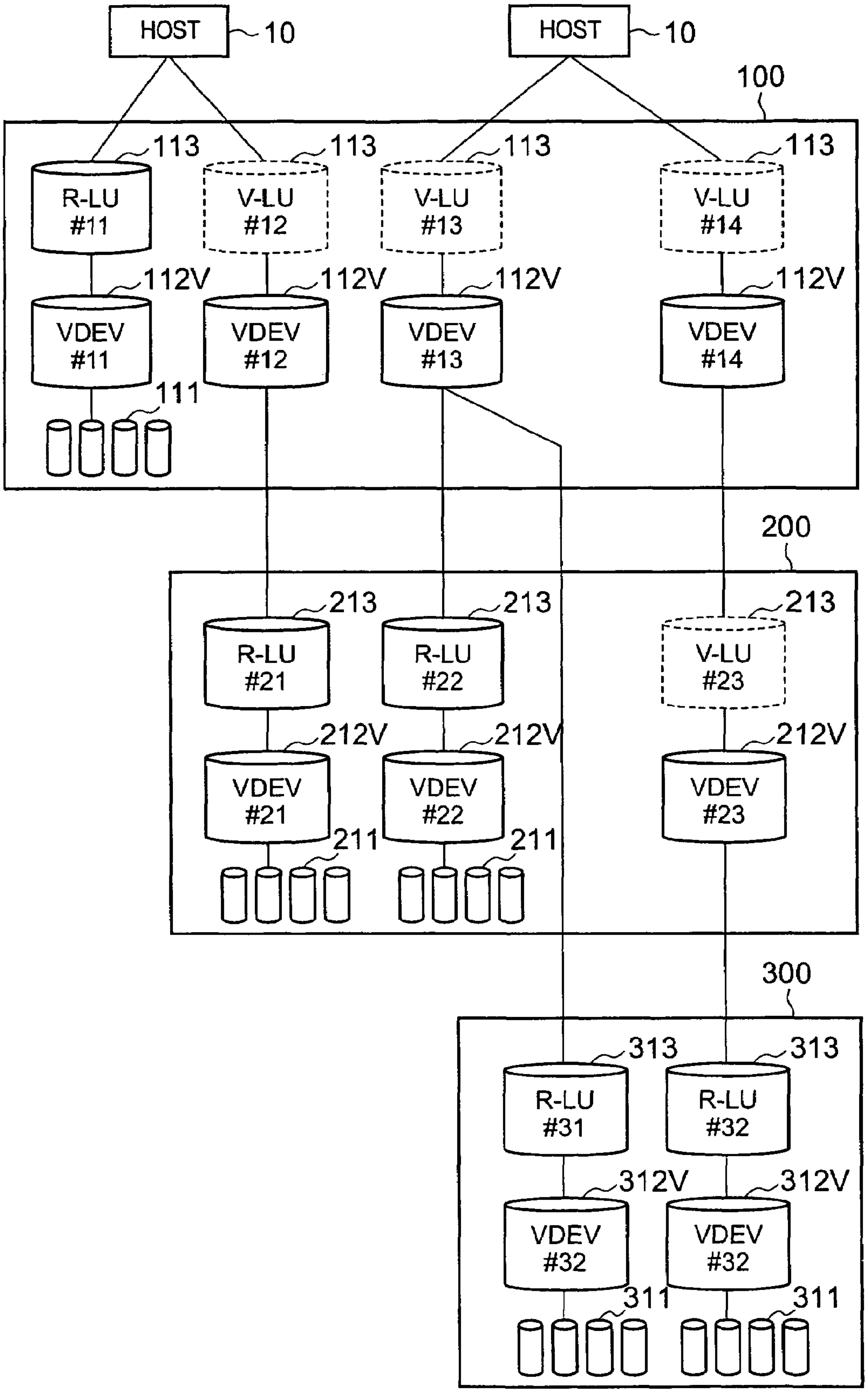
FIG. 4 is an explanatory diagram showing the storage configuration of a storage system.

FIG. 4 is an explanatory diagram which schematically shows the storage configuration of the storage system. The connection source storage control apparatus 100 can comprise a plurality of logical volumes 113. The logical volumes can be broadly divided into real volumes and virtual volumes. In FIG. 4, real volumes indicated by solid lines are distinguished by “R-LU”, and virtual volumes indicated by broken lines are indicated by “V-LU”.

Each logical volume 113 is connected to an intermediate storage device (VDEV) 112V, regardless of whether the volume is a real volume or a virtual volume.

An intermediate storage device 112V corresponds to a RAID group 112. However, an intermediate storage device 112V not accompanied by a physical entity is a virtual intermediate storage device, and exists in cache memory 140. An intermediate storage device not accompanied by a physical entity is a device not linked to a disk drive 111 in the connection source storage control apparatus 100, that is, a device in which a virtual volume is provided.

These virtual intermediate storage devices (VDEV#12, VDEV#13, VDEV#14) 112V are ultimately associated with one of the real volumes. In FIG. 4, the intermediate storage devices 112V indicated by “VDEV#12, VDEV#13” are associated, respectively, with the real volume (R-LU#21) 213 of the first connection destination storage control apparatus 200, and with the real volume (R-LU#22) 213 of the first connection destination storage control apparatus 200 and the real volume (R-LU#31) 313 of the second connection destination storage control apparatus 300.

The intermediate storage device 112V indicated as “VDEV#14” is connected to a real volume (R-LU#32) in the second connection destination storage control apparatus 300 via the virtual volume (V-LU#23) 213 of the first connection destination storage control apparatus 200. In this way, virtual volumes provided to the host 10 can be associated with a real volume via another virtual volume.

Similarly to the storage hierarchy of the connection source storage control apparatus 100, each of the connection destination storage control apparatuses 200, 300 also can comprise a physical storage layer (disk drives 211, 311), an intermediate storage layer (212V, 312V) obtained by virtualizing the physical storage layer, and a logical storage layer (213, 313) provided so as to remove portions of the storage area of the intermediate storage layer.

The configuration shown in FIG. 4 is merely an example used for illustration, and other configurations are possible. For example, an intermediate storage device can be provided in a single disk drive. Or, a plurality of logical volumes can be configured from a single intermediate storage device; or, a single logical volume can be configured from a plurality of intermediate storage devices.

FIG. 5 is an explanatory diagram showing a volume management table T1 to manage logical volumes within the storage system. This volume management table T1 can be stored in the shared memory 150 of the connection source storage control apparatus 100. Also, all of or a portion of the table T1 can be copied to local memory in each of the CHAs 120. This table T1 can also be copied to the connection destination storage control apparatuses 200, 300, and so can be shared among all the storage control apparatuses.

The volume management table T1 associates and manages, for example, volume numbers, volume sizes, intermediate storage device numbers, intermediate storage device sizes, device types, apparatus numbers, and address information. As is similarly the case in the following explanation, volume numbers in the drawings are values set in each diagram as convenient for purposes of explanation, and are not mutually related.

In the storage system, a volume number (with “number” abbreviated to “#” in the figure) is identifying information which is uniquely assigned to each logical volume in the storage system. The volume size is the storage capacity of the logical volume. The intermediate storage device number is information used to identify the intermediate storage device (VDEV) in which the logical volume is provided. The intermediate storage device size is the storage capacity of the intermediate storage device. The device type is information indicating the type of physical entity (disk drive) associated with the intermediate storage device. The apparatus number is information used to identify the storage control apparatus having the data storage location (that is, the disk drive and real volume) of the logical volume. Address information is information used to access the data storage location of the logical volume.

Real volumes within the connection source storage control apparatus 100 are associated with disk drives 111 within the connection source storage control apparatus 100. Hence in a real volume in the storage control apparatus 100, a drive number list to identify associated disk drives 111 is set in the address information. On the other hand, a virtual volume within the connection source storage control apparatus 100 is associated with real volumes 213, 313 within the connection destination storage control apparatuses 200, 300. Hence communication path information to access associated external real volumes is set, as address information, in virtual volumes in the storage control apparatus 100.

Here, a real volume existing outside the connection source storage control apparatus 100, that is, real volumes 213, 213 of the connection destination storage control apparatuses 200, 300, are called external volumes, and real volumes 113 existing within the connection source storage control apparatus 100 can be called internal volumes. Address information (communication path information) set in the virtual volumes within the connection source storage control apparatus 100 can contain, for example, an external volume LUN (Logical Unit Number), a WWN, or similar.

The configuration of the volume management table T1 is not limited to that shown in FIG. 5. It is sufficient that the table contain information enabling identification of the relations between each of the logical volumes 113 in the connection source storage control apparatus 100 and the disk drives 111 or external volumes 213, 313 corresponding to these logical volumes 113.

Further, a volume status management table or similar to manage the various state of logical volumes can also be prepared, separately from the volume management table T1. In such a management table, information on volumes forming copy pairs, free space, and other information is managed.

FIG. 6 is an explanatory diagram showing a function management table T2 used to manage functions which can be used by each of the storage control apparatuses 100, 200, 300. This management table T2 can for example be stored in the shared memory 150 of the connection source storage control apparatus 100.

The function management table T2 can be configured so as to associate each apparatus number, for example, with one or a plurality of supported functions. A supported function is a function which can be utilized within a storage control apparatus. Supported functions registered in the management table T2 may be equivalent to all the functions of the storage control apparatus; or, only a portion of the functions of a storage control apparatus may be registered in the management table T2 as a supported function.

As explained below, the user can, via the management server 20 or similar, select functions which can be executed by the storage control apparatuses 100, 200, 300. That is, of all the functions provided in the storage control apparatuses, the user can select an arbitrary function, and can cause only this selected function to be registered in the management table T2 as a function which can be executed within each of the storage control apparatuses.

FIG. 7 is an explanatory diagram showing a function executing apparatus management table T3, to manage the apparatus executing functions for which there has been an execution function from the host 10. This management table T3 can be stored in the shared memory 150 of the connection source storage control apparatus 100, similarly to the tables T1 and T2.

The function executing apparatus management table T3 is configured to comprise individual function executing apparatus management tables T31 to T33, to individually manage executing apparatuses for each function. For example, table T31 manages information regarding which storage control apparatus will execute the local volume copy function. Table T32 manages information regarding which storage control apparatus executes the encryption function. And table T33 manages information regarding which storage control apparatus executes the compression function.

The function executing apparatus management tables T31 to T33 are configured so as to associate, for example, information to identify a volume to which an executed function is applied (volume numbers), information to identify an executing apparatus (apparatus number), and conditions for execution of the function (execution conditions). Execution conditions are further explained below.

Focusing on the table T31 which manages the executing apparatus for the local volume copy function, this table T31 associates and manages copy source volume numbers, copy destination volume numbers, executing apparatus numbers, and execution conditions. Here, as indicated in the final row of the table T31, local volume copying may in some cases by realized through remote copying. For example, when the physical entities (real volumes) of the copy source volume and the copy destination volume are distributed in the connection destination storage control apparatuses 200 and 300, the remote copy function between the connection destination storage control apparatuses 200 and 300 is used to accomplish copying between virtual volumes.

The table T32 to manage the executing apparatus for the encryption function, and the table T33 to manage the executing apparatus for the compression function, also are configured to contain information identifying the range of volumes to which the functions can be applied, information to identify the storage control apparatus which is to execute the function, and execution conditions.

Execution conditions are explained. As stated above, execution conditions are startup conditions for execution of the function. Execution conditions may be set so as to stipulate, for example, "None"; "when the storage control apparatus of the origin of the execution request (the connection source storage control apparatus) has a load exceeding a prescribed threshold"; "when the storage control apparatus of the destination of the execution request (a connection destination storage control apparatus) has a load less than a prescribed threshold"; "when the storage control apparatus of the origin of the execution request has a load equal to or greater than a prescribed threshold, and moreover the storage control apparatus of the destination of the execution request has a load less than a different prescribed threshold"; and similar.

A function for which "None" is stipulated as the execution condition can be executed unconditionally by a storage control apparatus registered as an executing apparatus. A function for which the relation between a threshold and the current load is registered as an execution condition can be executed by a storage control apparatus registered as an executing apparatus only when this condition is satisfied.

Here, execution conditions can also be defined in terms of conditions other than loads. For example, execution conditions such as, "execution is permitted only when the time required for function execution is within a time frame specified in advance", or "execution is permitted when the host requesting the function execution is a host specified in advance", can also be set. Execution conditions can also be set in combination with time frames, originating host numbers, and load state.

The configuration of the function executing apparatus management table T3 is not limited to that shown in FIG. 7. For example, management can be performed in units of logical volumes, as shown in FIG. 7; or, management of the apparatuses executing functions can be performed in units of blocks within volumes. Or, a plurality of volumes can be grouped together and managed, with the apparatuses for function execution managed in group units. Function execution apparatuses can also be managed in units of the storage control apparatus. Or, configurations are possible which set values for each function in different management units (volume units, block units, group units, or similar).

FIG. 8 shows an example of a user interface provided to users. The windows G1 and G2 shown in FIG. 8 display, for example, the windows of the management server 20 and management terminal 31. In the top half of FIG. 8 is shown the window G1, enabling the user to select functions for use by each storage control apparatus.

This window G1 can comprise, for example, an apparatus-number specification section G11, function display section G12, use setting section G13, execution condition setting section G14, registration button B11, and cancellation button B12.

The apparatus number specification section G11 is used to select one of the storage control apparatuses 100, 200, 300. The function display section G12 lists the names of all the functions of a selected storage control apparatus. The use setting section G13 is used to select functions to be used (functions planned for execution) among the displayed function names. The execution condition setting section G14 sets the conditions for execution of a selected function. In the figure, in order to show the values which can be taken in the use setting section G13, an example is shown in which the first connection destination storage control apparatus 200 does not use the local volume copy function. Further, due to limitations of space the display details of the execution condition setting section G14 are simplified.

In the lower half of FIG. 8 is shown a window G2 used to set the storage control apparatus for execution of functions selected by the user. This window G2 can comprise, for example, a function name selection section G21, execution volume display section G22, executing apparatus number setting section G23, registration button B21, and cancellation button B22.

The function name selection section G21 is used to select any of the functions from among those registered on the window G1. The execution volume display section G22 displays volume numbers to which a selected function is applied. The executing apparatus number setting section G23 sets the storage control apparatus to be used when executing a function for the volume in question.

The user interface shown in FIG. 8 is one example, and others are possible. The windows G1 and G2 can be combined into a single window, or the windows G1 and G2 can each comprise a plurality of windows. Further, each of the windows G1 and G2 can comprise elements (display fields, setting fields, and similar) other than those shown in FIG. 8.

Figure 9:
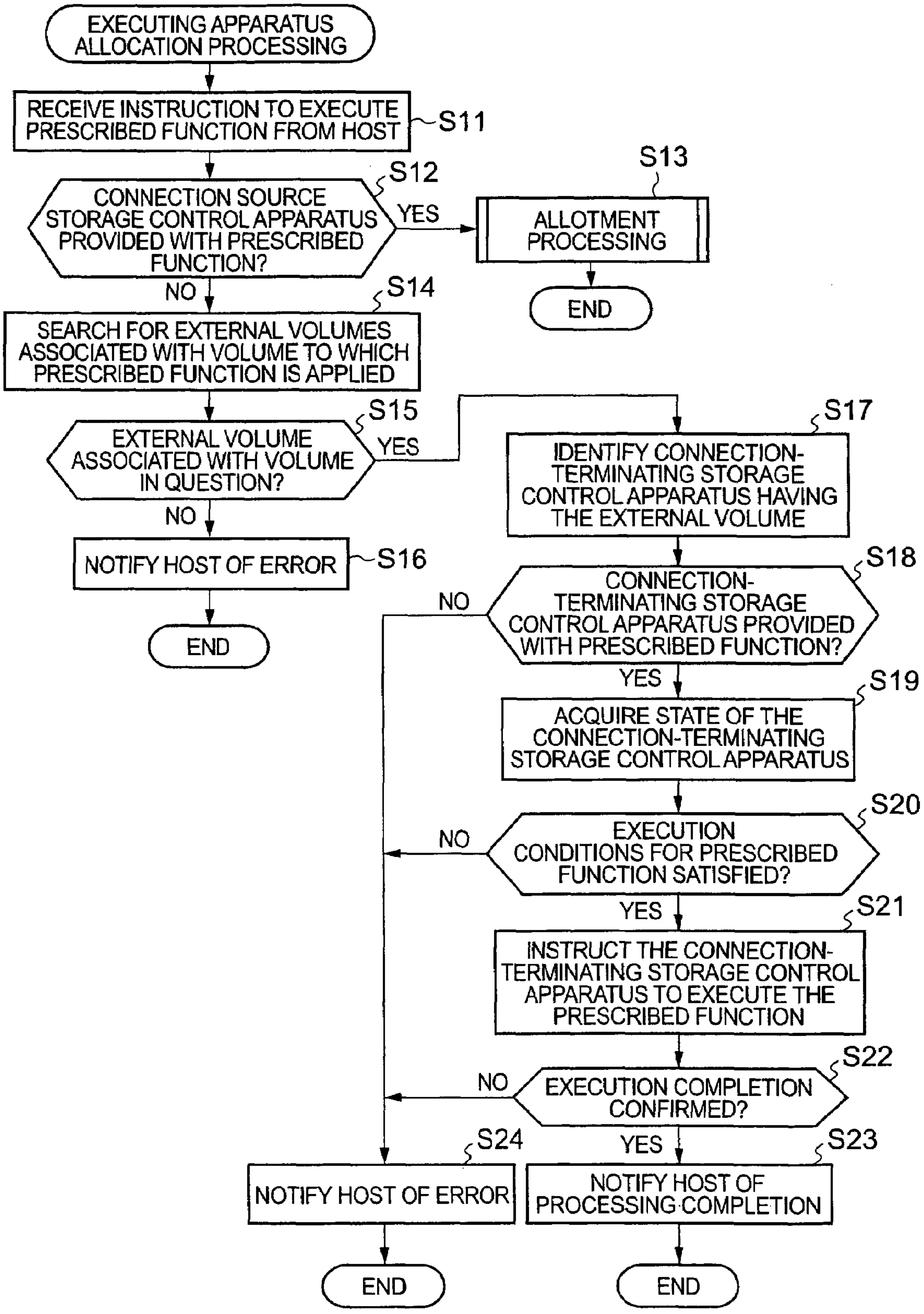
FIG. 9 is a flowchart showing executing apparatus allocation processing.
Figure 10:
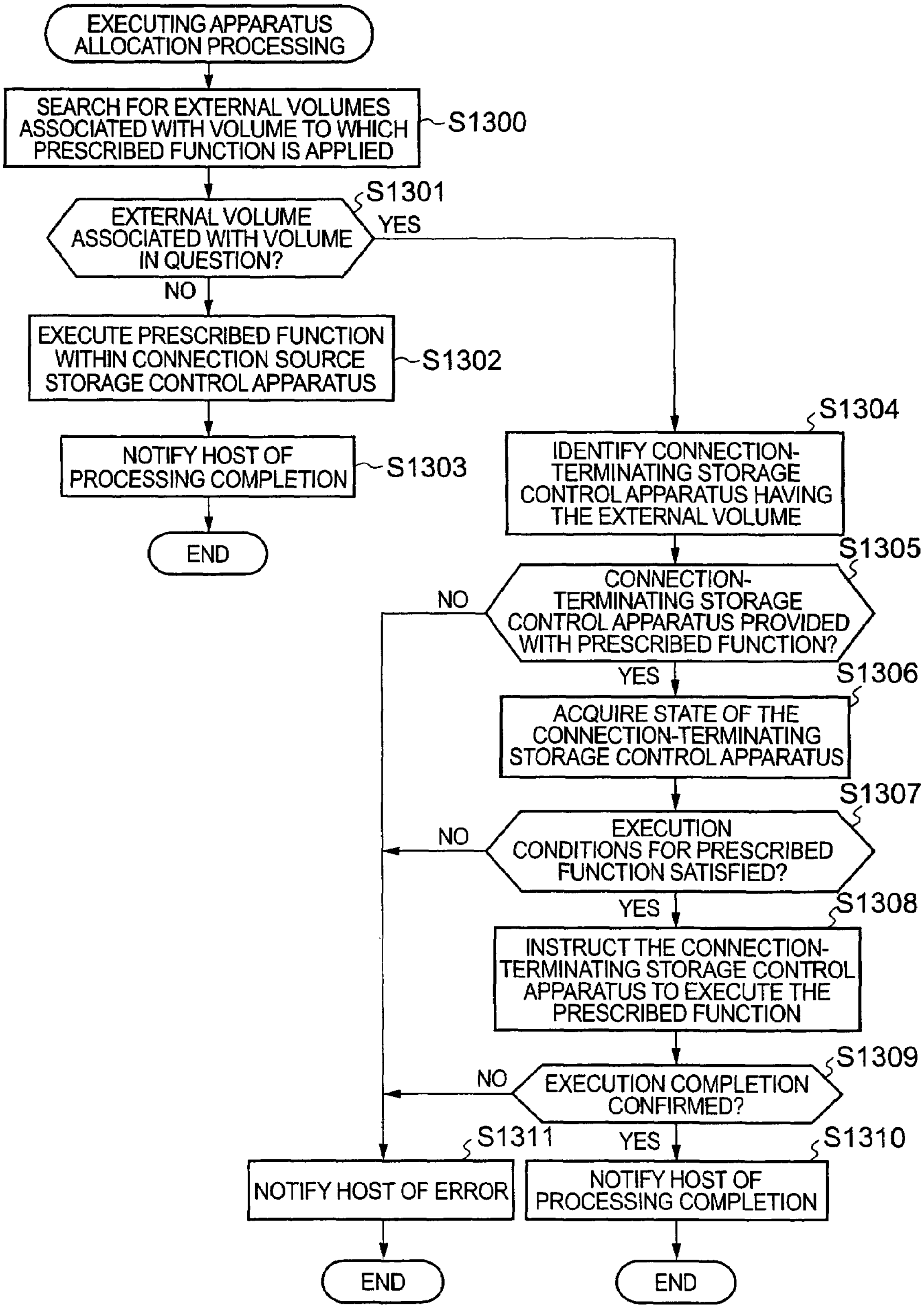
FIG. 10 is a flowchart showing the allotment processing in FIG. 9.

Next, operation to allocate appropriate storage control apparatuses to function execution is explained, referring to FIG. 9 and FIG. 10. FIG. 9 is a flowchart of allocation of an apparatus for function execution; FIG. 10 is a flowchart showing the details of the allotment processing (S13) in FIG. 9. In the following explanation, steps are abbreviated to "S". Further, and similarly in the subsequent explanations, each flowchart is created only to the extent necessary to understand and implement the invention, and differs from an actual computer program. This processing is executed by the controller 101 of the connection source storage control apparatus 100.

The controller 101 is instructed by the host 10 to execute a prescribed function (S11). A prescribed function is a function registered as a supported function. The host 10, by issuing a prescribed command containing information to identify the volume and the function for execution, requests execution of the prescribed function.

Here, the host 10 can request execution of a prescribed function by transmitting a prescribed command to the controller 101 via the I/O communication network CN11. For example, a command issued from the host 10 can be received directly by the controller 101 and processed; or, the command can be processed after first storing the command in a dedicated logical volume (also called a command device) for receiving commands. Further, the host 10 can also issue a request to the controller 101 to execute a prescribed function via the management communication network CN13.

Upon receiving a request for execution of a prescribed function from the host 10, the controller 101 judges whether the prescribed function can be executed by the connection source storage control apparatus 100 (S12). If the connection source storage control apparatus 100 can execute the prescribed function (S12: YES), the allotment processing shown in FIG. 10 is performed (S13). This allotment processing is performed to allot execution of prescribed functions requested by the host 10 among the connection source storage control apparatus 100 and the connection destination storage control apparatuses 200, 300. The allotment processing is further explained below in conjunction with FIG. 10.

If the prescribed function cannot be executed by the connection source storage control apparatus 100 (S12: NO), the controller 101 searches the external real volumes 212, 313 associated with the volume 113 for which the prescribed function is to be executed (S14). This search is performed by referencing the volume management table T1.

The controller 101 judges whether an external real volume 213, 313 is associated with the volume 113 for which the prescribed function is to be executed (S15). If an external real volume is not associated with the volume 113 in question (S15: NO), the controller 101 notifies the host 10 of an error (S16). For example, this is the case when the volume for which the prescribed function is to be executed is a real volume with the storage control apparatus 100, and moreover the prescribed function cannot be executed by the storage control apparatus 100. In such a case, the controller 101 notifies the host 10 that the requested prescribed function cannot be executed.

On the other hand, if the volume 113 for which the prescribed function is to be executed is a virtual volume, and is associated with one of the external real volumes 213, 313 (S15: YES), the controller 101 identifies the connection destination storage control apparatus having the associated real volume (S17). The volume management table T1 or the function executing apparatus management table T3 can be used for this identification.

Next, the controller 101 references the function management table T2, and judges whether the identified connection destination storage control apparatus (200 or 300) can execute the prescribed function (S18). If the identified connection destination storage control apparatus cannot execute the prescribed function (S18: NO), the controller 101 notifies the host 10 of an error (S24).

If the identified connection destination storage control apparatus can execute the prescribed function (S18: YES), the controller 101 acquires the state of the identified connection destination storage control apparatus (S19). Various methods can be used to acquire the state of the connection destination storage control apparatus.

For example, the controller 101 can issue a query command to the controller of the connection destination storage control apparatus, to query the load and other state parameters, and can detect the state of the connection destination storage control apparatus through the response to this command. Or, each of the connection destination storage control apparatuses 200, 300 can, either regularly or irregularly, notify the connection source storage control apparatus 100 of their own state. Or, each of the storage control apparatuses 100, 200, 300 can notify a management server 20 of their own state, and the management server 20 can manage the state of each of the storage control apparatuses. In this case, the controller 101 can query the management server 20 to acquire the state of the connection destination storage control apparatus registered as the executing apparatus.

Next, the controller 101 judges whether the execution conditions set for the prescribed function, execution of which has been requested by the host 10, are satisfied (S20). That is, the controller 101 judges whether the state of the connection destination storage control apparatus registered as the executing apparatus satisfies the execution conditions. If the execution conditions are not satisfied (S20: NO), the prescribed function cannot be executed, and so the controller 101 notifies the host 10 of an error (S24).

If the execution conditions are satisfied (S20: YES), the controller 101 instructs the connection destination storage control apparatus registered as the executing apparatus to execute the prescribed function (S21). The controller 101 converts the instruction details from the host 10 as appropriate and transmits the result to the connection destination storage control apparatus so as to obtain the result expected by the host 10.

The controller 101 then waits for notification of the completion of processing from the connection destination storage control apparatus which has been instructed to execute the prescribed function (S22). If for example a notification of processing completion has not arrived from the connection destination storage control apparatus within a prescribed time, set in advance (S22: NO), the controller 101 judges that the prescribed function has not been executed normally, and notifies the host 10 of an error (S24).

If notification indicating that processing has been completed normally is received from the connection destination storage control apparatus which has been requested to execute the prescribed function (S22: YES), the controller 101 notifies the host 10 of the normal completion of execution of the prescribed function (S23).

A configuration is also possible in which, at the time at which the connection destination storage control apparatus is instructed to execute the prescribed function (S21), the host 10 is notified of the completion of processing without waiting for reception of notification of the completion of processing from the connection destination storage control apparatus.

The allotment processing of S13 in FIG. 9 is explained, referring to FIG. 10. The controller 101 searches for external real volumes associated with the volumes to which the prescribed function is applied (S1300). The controller 101 judges whether an external real volume is associated with the volume to which the function is applied (S1301).

If no external real volumes are associated with the volume (S1301: NO), that is, if the volume in question is a real volume within the connection source storage control apparatus 100, the controller 101 executes the prescribed function (S1302). That is, the prescribed function requested by the host 10 is executed within the connection source storage control apparatus 100 for the real volume in question. The controller 101 then notifies the host 10 of the normal completion of processing (S1303).

If on the other hand the volume to which the prescribed function is to be applied is a virtual volume (S1301: YES), the controller 101 identifies the connection destination storage control apparatus having the external real volume associated with the virtual volume (S1304).

The controller 101 then executes steps similarly to those described in S18 to S23 in FIG. 9. That is, if the controller 101 judges that the identified connection destination storage control apparatus can execute the prescribed function (S1305: YES), the state of the connection destination storage control apparatus is acquired (S1306).

The controller 101 compares the execution conditions set in advance for the prescribed function execution of which has been requested by the host 10 with the state of the connection destination storage control apparatus, and judges whether the execution conditions are satisfied (S1307). If the execution conditions are satisfied (S1307: YES), the controller 101 instructs the connection destination storage control apparatus to execute the prescribed function (S1308).

Upon receiving processing completion notification from the connection destination storage control apparatus (S1309: YES), the controller 101 notifies the host 10 that the prescribed function has been applied normally to the volume in question (S1310).

Similarly to the explanation of FIG. 9, when the identified connection destination storage control apparatus is not provided with the prescribed function (S1305: NO), when the execution conditions for the prescribed function are not satisfied (S1307: NO), and when processing completion notification is not received from the connection destination storage control apparatus instructed to execute the prescribed function (S1309: NO), the controller 101 notifies the host 10 of an error (S1311).

The instruction to execute the prescribed function may be from the management server 20 or management terminal 31 as well as from the host 10.

By means of the above-described configuration, this embodiment has the following advantageous results. In this embodiment, even when a function is not provided in the connection source storage control apparatus 100, if the function is provided in the connection destination storage control apparatuses 200, 300, then execution of the function can be requested of a connection destination storage control apparatus capable of execution. Hence even requests for functions, which can be executed only by the connection destination storage control apparatuses 200, 300, can be accepted by and processed by the connection source storage control apparatus 100 by accepting requests from the host 10. As a result, the functionality of the connection source storage control apparatus 100, as seen from the host 10, can be enhanced. In other words, the functions of the connection source storage control apparatus 100, which is the interface for processing of the storage system, can be expanded in virtual form.

Hence in a storage system in which connection destination storage control apparatuses 200 and 300 each with unique characteristics coexist, even if the connection source storage control apparatus 100 serving as interface is not provided with a portion of or all of such functions, all of these characteristic functions can be caused to be executed, so that convenience of use is enhanced.

In this embodiment, a judgment is made as to whether a connection destination storage control apparatus 200 and 300 registered as an executing apparatus should be instructed to execute a prescribed function execution of which has been requested by the host 10, based on the details of the prescribed function and on the state of the connection destination storage control apparatuses registered as executing apparatuses. That is, if a connection destination storage control apparatus registered as an executing apparatus satisfies the execution conditions, the apparatus is instructed to execute the prescribed function. Hence the loads on connection destination storage control apparatuses can be prevented from becoming excessive, and loads can be distributed appropriately.

In this embodiment, functions which can be used are registered in advance for each storage control apparatus, and moreover a configuration is employed in which executing apparatuses can be set in advance for each function registered as a function which can be used. Hence loads can be distributed in function units, for improved convenience of use. Further, usable functions can be set for each storage control apparatus, so that task allotment among each of the storage control apparatuses 100, 200, 300 is possible.

Embodiment 2

Next, a second embodiment is explained using FIG. 11 through FIG. 14. Each of the following embodiments, including this embodiment, is equivalent to a modified example of the first embodiment. In each of the following embodiments, explanations of components which are redundant with above-described components are omitted, and explanations center mainly on characteristic portions. In this embodiment, a case is explained in which a compression function (including both compression and expansion) is used in each of the storage control apparatuses 100, 200, 300.

Figure 11:
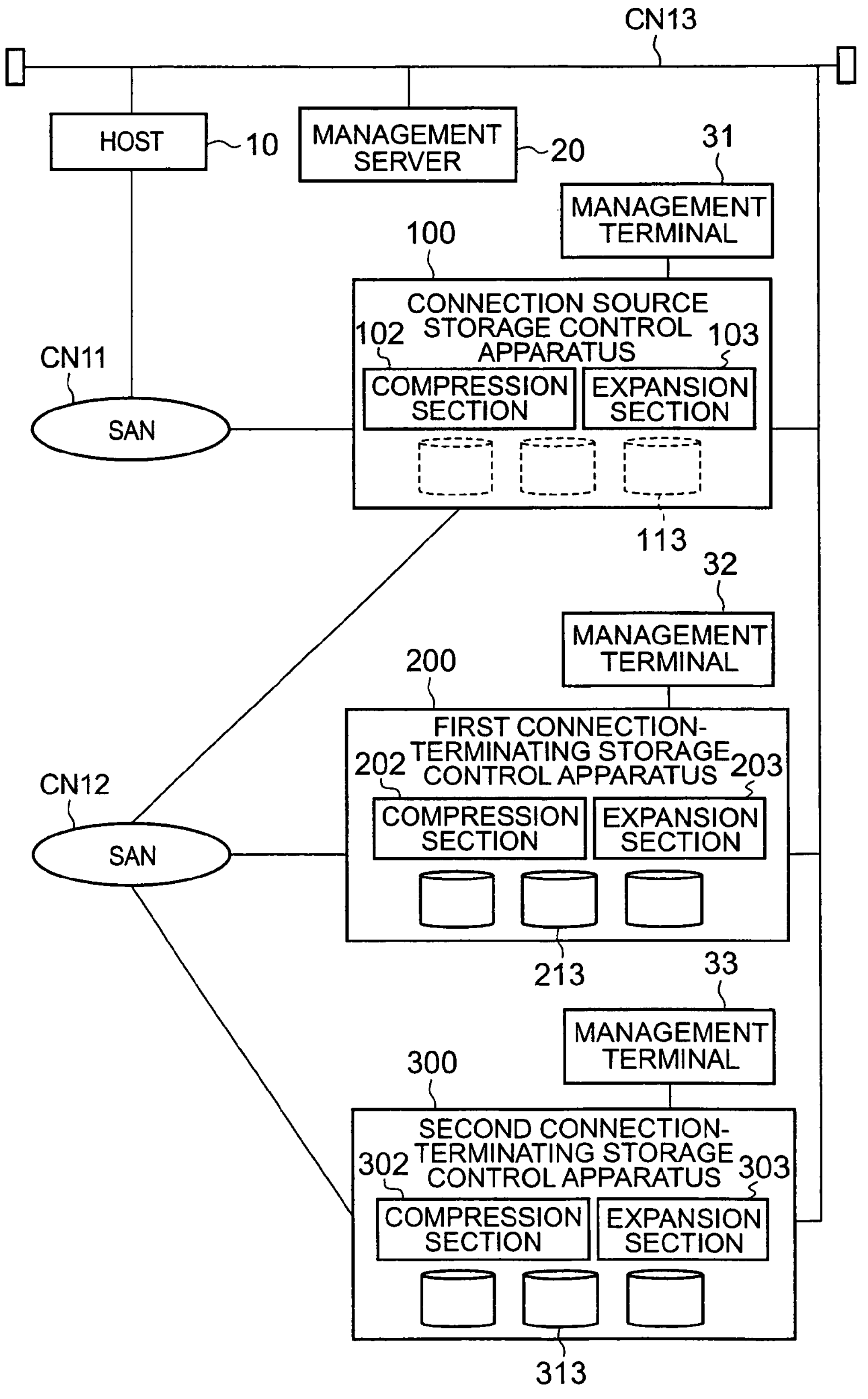
FIG. 11 is an explanatory diagram showing the overall configuration of a storage system of a second embodiment.

FIG. 11 is an explanatory diagram showing the overall configuration of the storage system of this embodiment. Each of the storage control apparatuses 100, 200, 300 is provided with a compression section and an expansion section. The connection source storage control apparatus 100 comprises a compression section 102 and an expansion section 103. Similarly, the first connection destination storage control apparatus 200 comprises a compression section 202 and an expansion section 203. The second connection destination storage control apparatus 300 comprises a compression section 302 and an expansion section 303.

The compression sections 102, 202, 302 compress input data according to a prescribed compression algorithm and output the compressed data. The expansion sections 103, 203, 303 restore input compressed data to the state prior to compression based on the compression algorithm used to compress the data, and output the result.

These compression sections 102, 202, 302 and expansion sections 103, 203, 303 can for example be configured as ASICs (Application-Specific Integrated Circuits) or other hardware circuits. Or, the compression sections 102, 202, 302 and expansion sections 103, 203, 303 can be configured as computer programs, and the computer programs can be read and executed by a CPU within the controller. Also, the compression sections can be configured as hardware circuits, and the expansion sections can be configured as computer programs.

FIG. 12 is an explanatory diagram showing an example of various management information used to execute the compression function within the storage system. In the upper part of FIG. 12 is shown management information held by each of the storage control apparatuses 100, 200, 300; in the lower part of FIG. 12 are shown details of the management information. The tables T1 to T3 described in the above embodiment are also provided in the connection source storage control apparatus 100, but are omitted from FIG. 12.

The connection source storage control apparatus 100 holds a compression function setting management table T4, compression state management table T5, and compression management information T6. Each of the connection destination storage control apparatuses 200, 300 holds a compression function setting management table T4 and compression management information T6.

The compression function setting management table T4 is a table to set, for each volume, the execution mode of the compression function. The table T4 is configured so as to associate, for example, the volume number of a volume for application of the compression function, a compression execution setting to set whether to perform compression, an expansion execution setting to set whether to perform expansion, and a compression algorithm to be used.

Either “compress” or “not compress” values are set for each compression execution setting. When a “compress” value is set, the compression section performs compression. In this case, the compression section compresses the input data and outputs the result. That is, the storage control apparatus compresses the received data and stores the result in the volume. When “not compress” is set, the compression section does not perform compression. In this case, the input data is output as-is, without modification. That is, the storage control apparatus stores the received data in the volume as-is, without performing compression.

Either “expand” or “not expand” values are set for expansion execution settings. When “expand” is set, the expansion section performs expansion. In this case, the storage control apparatus expands data read from the volume and transfers the data. When “not expand” is set, the expansion section does not perform expansion. In this case, the input data is output as-is, without modification. In other words, the storage control apparatus transfers the data read from the volume as-is.

As compression algorithms, for example, the run-length algorithm, Huffman algorithm, or various other well-known compression algorithms can be used.

The compression state management table T5 manages the compression state of each volume. This table T5 is configured to associate, for example, volume numbers, compression state, and compression algorithms. Either “compressed” or “uncompressed” is set as the value of the compression state. A volume set as “compressed” stores compressed data; a volume set as “uncompressed” stores data which has not been compressed.

The compression management information T6 manages various information which changes with compression. The compression management information T6 can associate, for example, volume numbers, addresses prior to compression, addresses after compression, and compression algorithms. By referencing the compression management information T6, the storage control apparatus (controller) can accommodate read and write requests for compressed data.

In this embodiment, a configuration is employed in which the compression management information T6 is common to all of the storage control apparatuses 100, 200, 300. Hence the storage control apparatus which is to execute compression or expansion can be switched.

Figure 13:
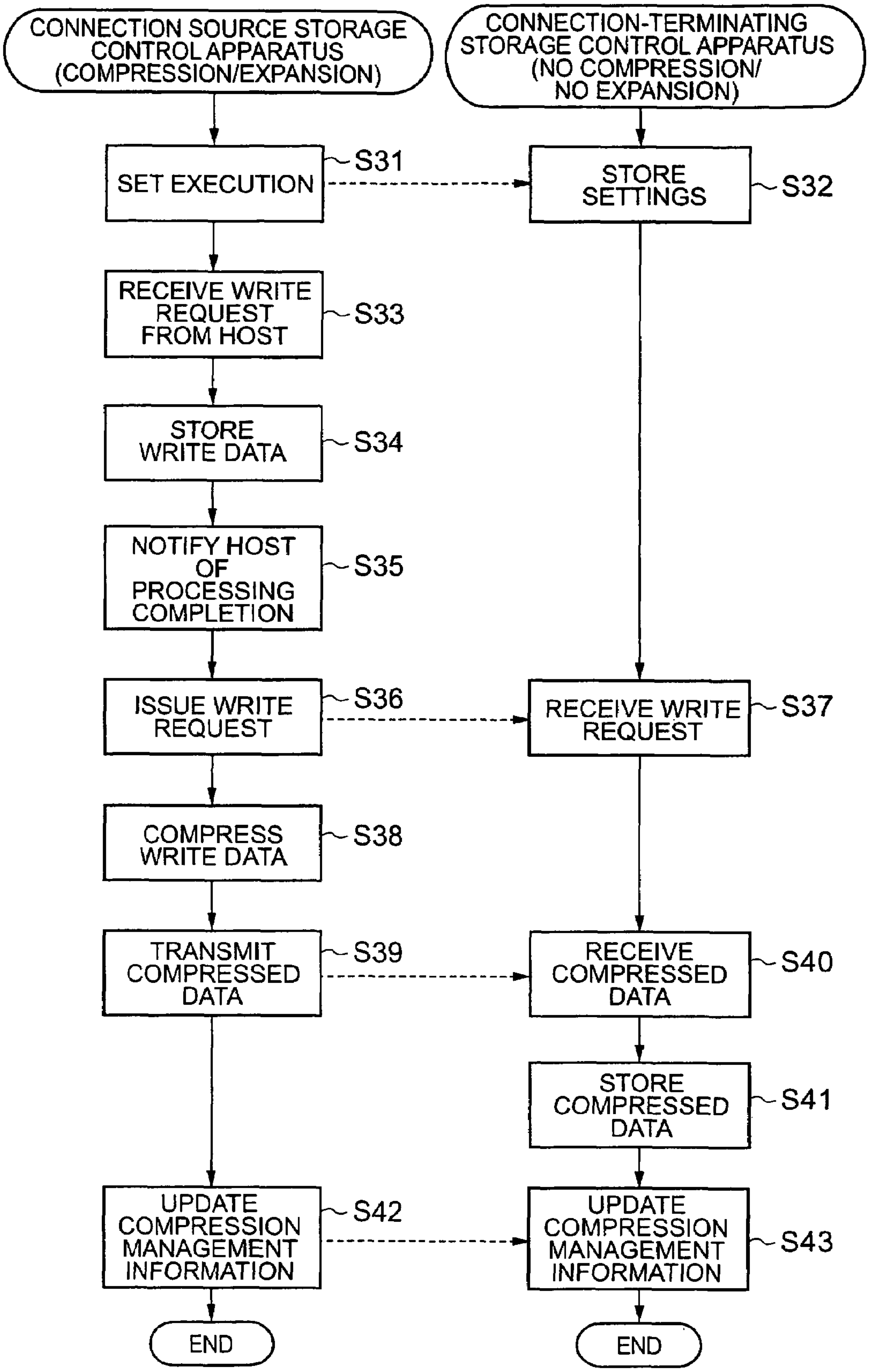
FIG. 13 is a flowchart showing processing to compress and store write data.

Next, execution of compression and expansion is explained. Here, an example is explained in which only the connection source storage control apparatus 100 executes compression and expansion. FIG. 13 is a flowchart showing compression. In this flowchart, write data to be written to a virtual volume is compressed by the connection source storage control apparatus 100 (controller 101), and the compressed data is stored in a real volume 213 of a connection destination storage control apparatus (here assumed to be the first connection destination storage control apparatus 200).

First, the controller 101 sets the execution mode for the compression function of the connection destination storage control apparatus 200 to “not compress” and “not expand” (S31, S32). That is, data compression functions are disabled in the controller 201.

In this state, upon receiving the write data from the host 10 (S33), the controller 101 stores the write data in cache memory 140 (S34), and notifies the host 10 of the completion of write command processing (S35). As explained above, there are synchronous and asynchronous methods of write command processing. Hence a configuration may also be employed in which the host 10 is notified of the completion of write command processing after confirmation that the write data has been stored by the connection destination storage control apparatus 200.

The controller 101 issues a write command to the connection destination storage control apparatus 200, explicitly stating the real volume 213 for data storage (S36). The controller 201 of the connection destination storage control apparatus 200, upon receiving the write command, secures a cache area to store the write data (S37).

The controller 101 uses the compression section 102 to compress the write data (S38), and transmits the compressed write data to the controller 201 (S39). The controller 201 receives the compressed write data (S40), and stores the compressed write data in cache memory or in the real volume 213 (S41).

Here, because compression is disabled in the connection destination storage control apparatus 200, the controller 201 stores the compressed write data received from the controller 101 in the real volume 213 as-is. The controller 201, after storing the compressed write data in cache memory, can with appropriate timing cause the data to be stored in disk drives 211 of the real volume 213.

The controller 101 then updates address information and similar of the compression management information T6 (S42). The controller 201 also updates compression management information T6 (S43). For example, each time compressed data is received, the controller 201 can query the controller 101 for updated compression management information T6, to update the compression management information T6 within the controller 201. Or, the controller 101 can notify the controller 201 of the updated portions of the compression management information T6. A configuration may also be employed in which a volume for management data to be used in common by a plurality of storage control apparatuses is provided, and compression management information T6 is stored within this volume for management information. A configuration is also possible in which a management server 20 or similar manages the compression management information T6 in a unified manner.

Figure 14:
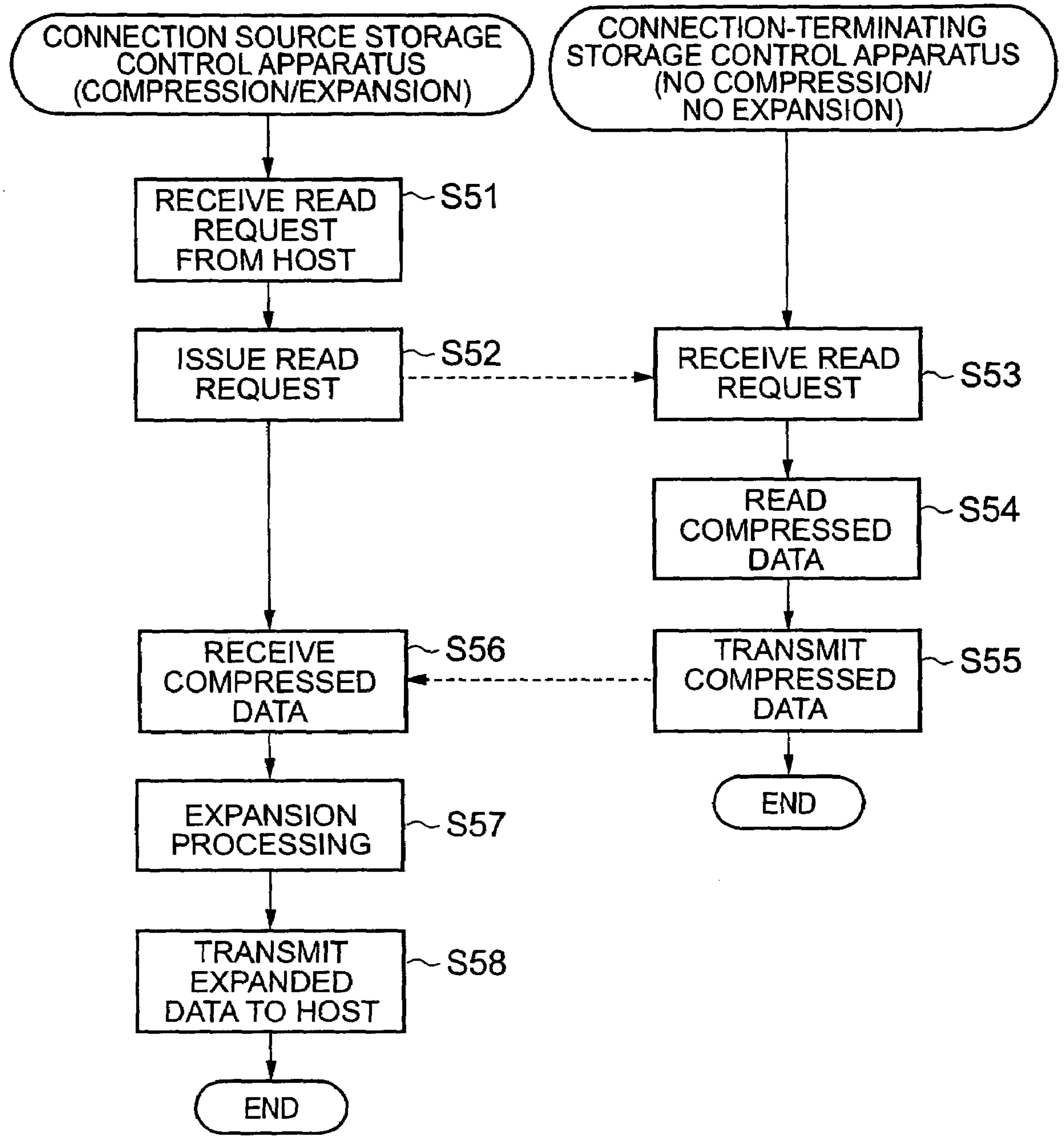
FIG. 14 is a flowchart showing processing to read and expand compressed data.

FIG. 14 is a flowchart showing expansion. The controller 101, upon receiving from the host 10 a read command requesting data reading from a virtual volume (S51), issues a separate read command to the connection destination storage control apparatus 200 (S52). This read command contains information to access the real volume 213 which actually stores the compressed data, the read address, and similar. The controller 101 can reference the compression management information T6 to cause the data requested by the host 10 to be read from the real volume 213.

The controller 201 of the connection destination storage control apparatus 200, upon receiving a read command from the controller 101 (S53), secures a cache area for temporary storage of data, and reads the compressed data from the disk drive 211 corresponding to the real volume 213 (S54). After storing the compressed data in cache memory, the controller 201 transmits the compressed data to the controller 101 (S55). Here, because expansion is disabled in the connection destination storage control apparatus 200, the compressed data is read in the compressed state from the disk drive 211 and transmitted to the controller 101.

Upon receiving the compressed data from the controller 201 (S56), the controller 101 expands the compressed data (S57), and transmits the expanded data to the host 10 (S58).

In this embodiment configured as described above also, advantageous results similar to those of the first embodiment are obtained. In addition, in this embodiment each of the storage control apparatuses 100, 200, 300 is provided with a common compression function, and the execution mode of the compression function can be set in each case as appropriate. Hence the user can freely set values to perform compression or expansion in any of the storage control apparatuses, so that load distribution is possible, and user convenience is improved.

Embodiment 3

Figure 15:
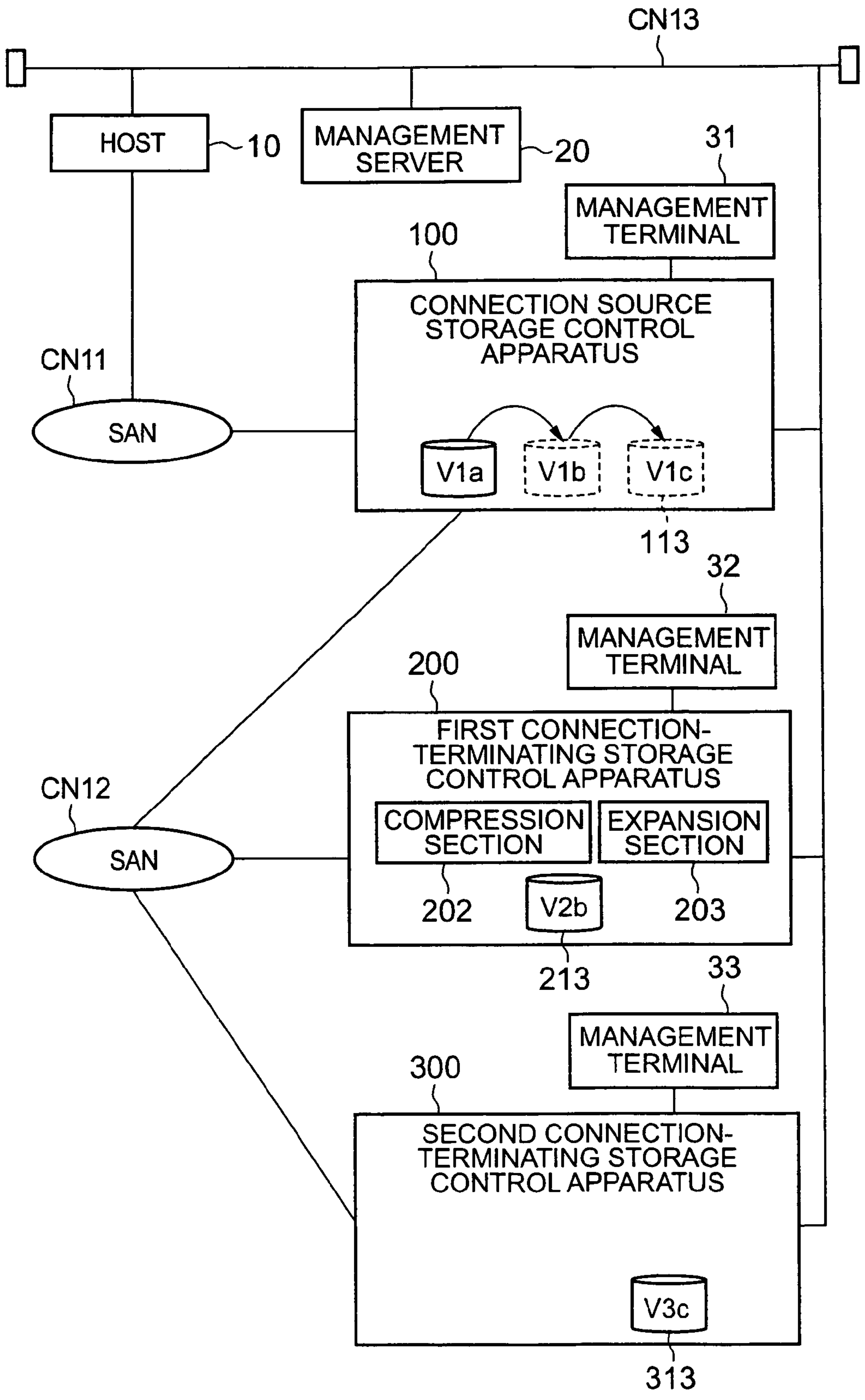
FIG. 15 is an explanatory diagram showing the overall configuration of the storage system of a third embodiment.
Figure 16:
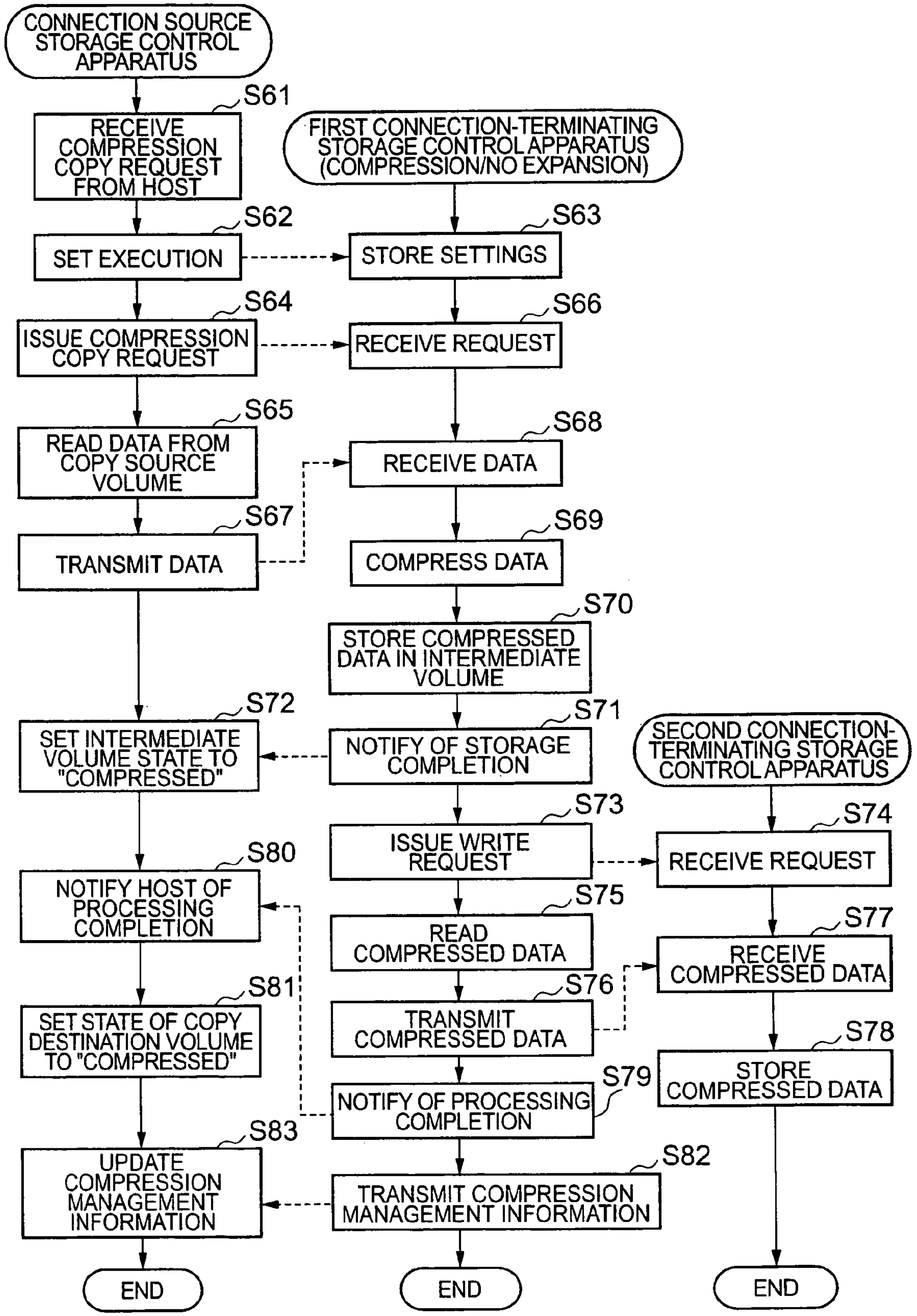
FIG. 16 is a flowchart showing compression copy processing.
Figure 17:
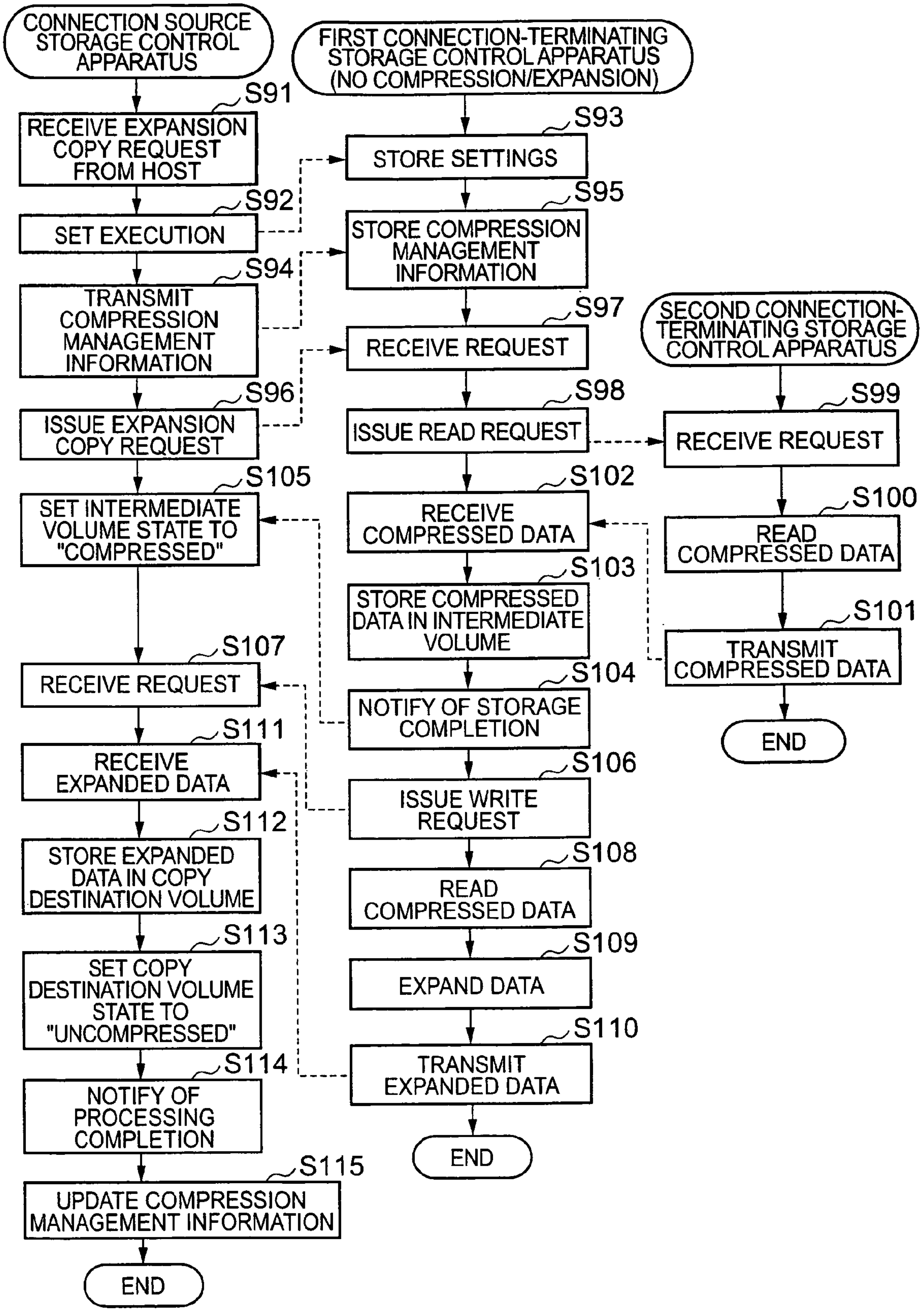
FIG. 17 is a flowchart showing expansion copy processing.

A third embodiment is explained using FIG. 15 through FIG. 17. In this embodiment, only one connection destination storage control apparatus has a compression function; this compression function is used to compress the data of a copy source volume and store the result in a copy destination volume.

FIG. 15 is an explanatory diagram showing the overall configuration of the storage system of this embodiment. For convenience of explanation, in the following the connection destination storage control apparatus provided with a compression function (a compression section and expansion section) is assumed to be the first connection destination storage control apparatus 200. The copy source volume V1*a* is assumed to be a real volume of the connection source storage control apparatus 100, and the copy destination volume V1*c* is assumed to be a virtual volume associated with a real volume V3*c* of the second connection destination storage control apparatus 300.

As shown in FIG. 15, the connection source storage control apparatus 100 comprises the copy source volume V1*a*, a relay volume V1*b* for compression, and the copy destination volume V1*c*. The copy source volume V1*a* is a real volume within the storage control apparatus 100. The relay volume V1*b* is a virtual volume, associated with a real volume V2*b* of the first connection destination storage control apparatus 200. The copy destination volume V1*c* is a virtual volume, associated with a real volume V3*c* of the second connection destination storage control apparatus 300. Only the first connection destination storage control apparatus 200 is provided with a compression section 202 and expansion section 203.

The above premises are for convenience of explanation, and others may be used. For example, if the copy source volume V1*a* and copy destination volume V1*c* are volumes recognized by the host 10, then they can exist anywhere. It is sufficient that the physical entity (real volume) of a volume for compression exist in a storage control apparatus 200 having a compression function.

FIG. 16 is a flowchart showing processing when data is compressed and written from a copy source volume V1*a* to a copy destination volume V1*c*. The controller 101 receives, from the host 10 or from the management server 20 or management terminal 31, a compression copy request with the contents, "compress the data of copy source volume V1*a*, via compression relay volume V1*b*, and store the result in copy destination volume V1*c*" (S61).

The controller 101 sets the compression function of the controller 201 to "compress" and "not expand" (S62, S63). That is, in the controller 201, compression is enabled, and expansion is disabled.

The controller 101 issues a compression copy request to the controller 201 having the compression function (S64), and reads data from the copy source volume V1*a* (S65). Then, the controller 101 transmits the data read from the copy source volume V1*a* to the controller 201 (S67).

The controller 201, upon receiving data from the controller 101 (S68), compresses the received data (S69), and causes the compressed data to be stored in the real volume V2*b* associated with the relay volume V1*b* (S70). This real volume V2*b* is also called a real volume for compression.

The controller 201 then notifies the controller 101 of the completion of compression and storage of the received data (S71). Upon receiving this notification, the controller 101 sets the compression state of the compression volume V1*b* in the compression state management table T5 to "compressed" (S72).

The controller 201 issues a write command to the controller 301 of the second connection destination storage control apparatus 300 (S73). Upon receiving the write command from the controller 201 (S74), the controller 301 secures a cache area to receive the write data.

The controller 201 reads the compressed data stored in the real volume for compression V2*b* (S75), and transmits the compressed data to the controller 301 (S76). The controller 301, upon receiving the compressed data (S77), causes the compressed data to be stored in the real volume V3*c* associated with the copy destination volume V1*c* (S78).

Upon completing transmission of the compressed data to the controller 301, the controller 201 notifies the controller 101 of the completion of compressed data copying (S79). Upon receiving this notification, the controller 101 notifies the host 10 of the completion of compression copying (S80), and sets the compressed state of the copy destination volume V1*c* in the compression state management table T5 to "compressed" (S81).

The controller 201 then transmits compression management information T6, reflecting the completion of the compression copy processing, to the controller 101 (S82). The controller 101 then updates the compression management information T6 which it itself manages (S83).

The compression management information T6 need not necessarily be managed by the connection source storage control apparatus 100 (controller 101), but may be managed by the second connection destination storage control apparatus 300 having the copy destination volume. Or, the compression management information T6 may be managed by the first connection destination storage control apparatus 200 having the compression function, or may be managed by a management server 20. The compression management information T6 is necessary in order to process read commands and write commands from the host 10 for compressed data.

FIG. 17 is a flowchart showing expansion copy processing. In this processing, in a process opposite that of the compression copy processing of FIG. 16, compressed data stored in the volume V1*c* is expanded and copied to the volume V1*a*. Hence in this processing the copy source volume is V1*c*, and the copy destination volume is V1*a*.

The controller 101 receives an expansion copy request from the host 10, the management server 20 or similar, with the contents "expand the data (compressed data) stored in the copy source volume V1*c*, via the relay volume for expansion V1*b*, and store the data in the copy destination volume V1*a*" (S91). The controller 101, upon receiving the expansion copy request, sets the compression function of the controller 201 to "not compress" and "expand" (S92). By this means, the compression section 202 is disabled and the expansion section 203 is enabled in the controller 201 (S93).

Next, the controller 101 transmits the compression management information T6 to the controller 201 (S94), and causes the controller 201 to store the compression management information T6 (S95). When the compression management information T6 is managed by the first connection-destination storage control apparatus 200 (controller 201), S94 and S95 can be omitted. When the compression management information T6 is managed by the management server 20 or another external system, the system must be queried.

When these preparations for expansion copying have been completed, the controller 101 issues an expansion copy request to the controller 201 (S96). Upon receiving the expansion copy request (S97), the controller 201 issues a read command to the controller 301 of the second connection destination storage control apparatus 300 (S98).

Upon receiving the read command from the controller 201 (S99), the controller 301 reads compressed data from the copy source volume V3*c* (S100), and transmits the compressed data to the controller 201 (S101).

Upon receiving the compressed data from the controller 301 (S102), the controller 201 stores the compressed data as-is, without performing compression, in the real volume for relay V2*b* (S103). The controller 201 then notifies the controller 101 of the completion of compressed data storage (S104). Upon receiving this notification, the controller 101 sets the compressed state of the relay volume V1*b* in the compression state management table T5 to "compressed" (S105).

Next, the controller 201 issues a write command to the controller 101 (S106). Upon receiving the write command from the controller 201 (S107), the controller 101 secures an area in cache memory 140 for storage of the data received from the controller 201. Data transfer may also be realized by means of a read command from controller 101 to controller 201.

The controller 201 reads the compressed data from the real volume for relay V2*b* (S108), and causes this compressed data to be expanded (S109). The controller 201 then transmits the expanded data to the controller 101 (S110). The compressed data may be expanded while reading, or the compressed data may all be read first and then expanded.

Upon receiving the expanded data from the controller 201 (S111), the controller 101 causes the expanded data to be stored in the copy destination volume V1*a* (S112). The controller 101 then sets the compressed state of the copy destination volume V1*a* in the compression state management table T5 to "uncompressed" (S113).

The controller 101 notifies the host 10 of the completion of expansion copy processing (S114), and causes the compression management information T6 to be updated (S115). Similarly to the above explanations, the compression management information T6 can also be managed by the controller 201 or similar.

This embodiment, configured as described above, also provides advantageous results similar to those of the above first embodiment. In addition, according to this embodiment when only a single storage control apparatus 200 in the storage system is provided with a compression function, this compression function can be used effectively to copy and move volume data, for improved convenience of use.

Further, when a plurality of storage control apparatuses are each provided with compression functions, for example only the compression function of a storage control apparatus 200 with small storage capacity may be enabled, so that compression. and expansion are concentrated in a single storage control apparatus. By this means, the processing performance of a storage control apparatus 200 with a small amount of free storage space can be utilized effectively.

And, even when there is little free storage space in the storage control apparatus 200 having a compression function, by saving compressed data to a storage area of another storage control apparatus 300, the amount of free storage area of the storage control apparatus 200 with the compression function can be decreased.

Embodiment 4

Figure 18:
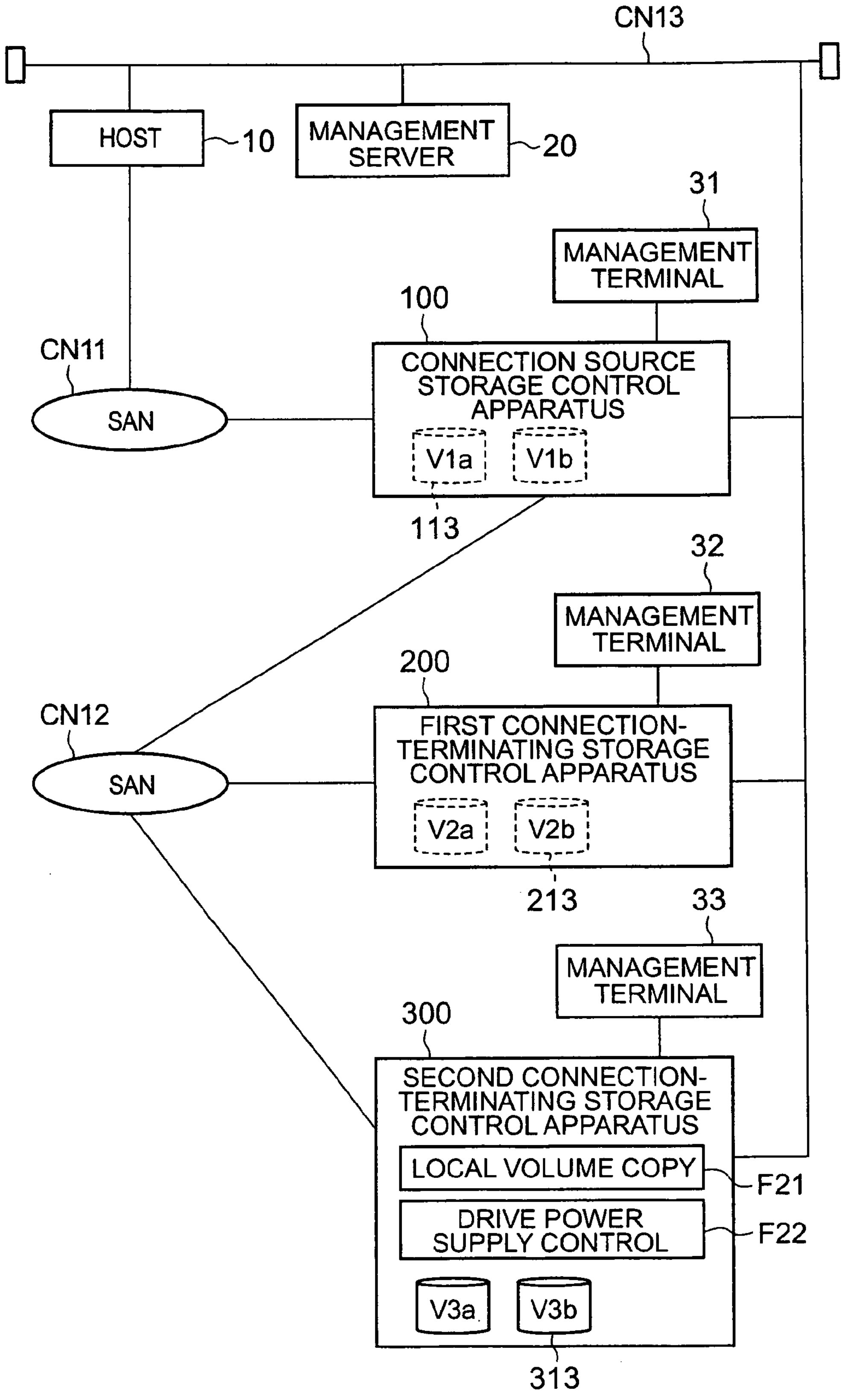
FIG. 18 is an explanatory diagram showing the overall configuration of the storage system of a fourth embodiment; and, FIG. 19 is a flowchart showing the operation of the storage system.
Figure 19:
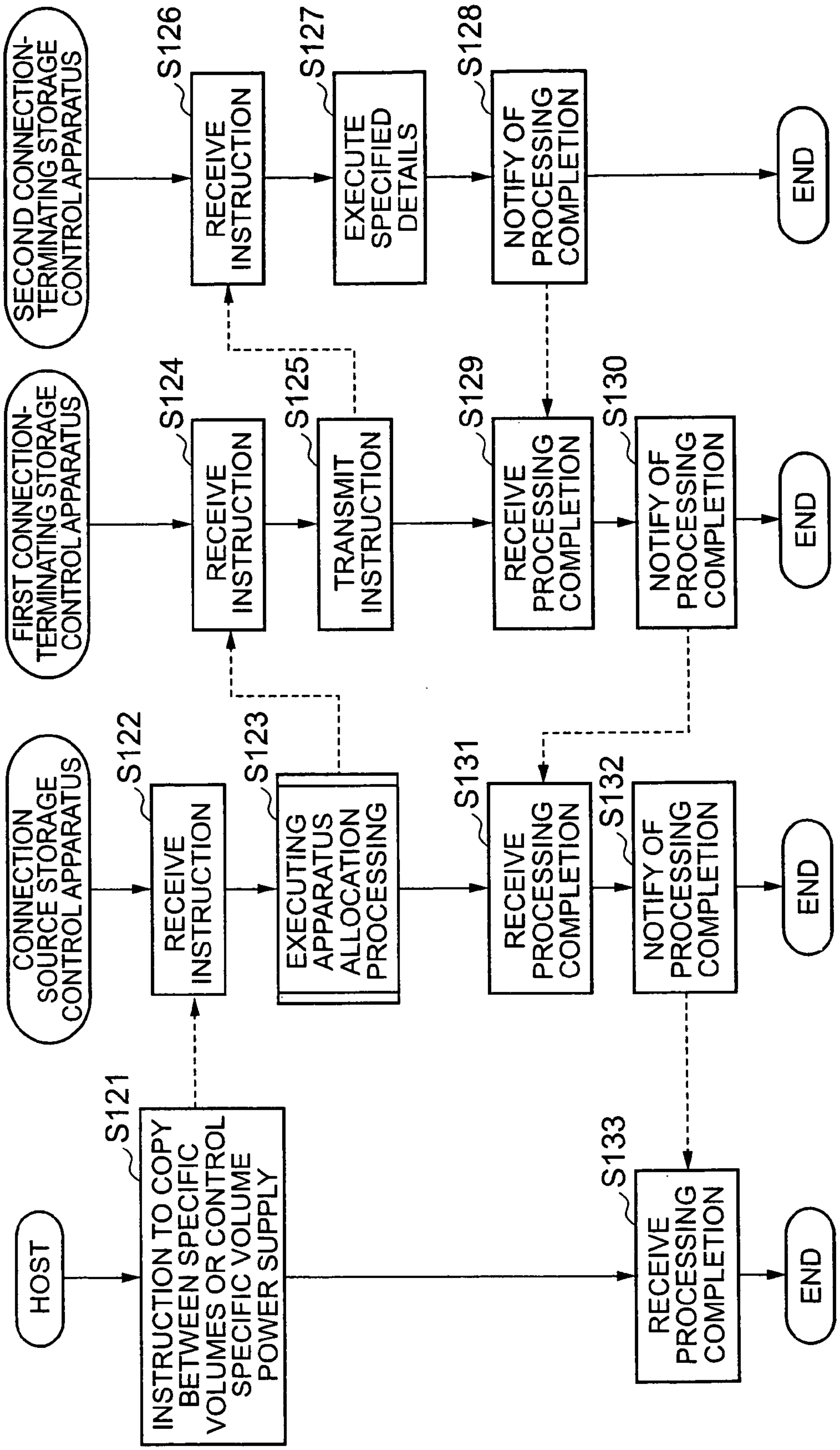

A fourth embodiment is explained using FIG. 18 and FIG. 19. In this embodiment, a request to execute a function is issued from the connection source storage control apparatus 100 to the second connection destination storage control apparatus 300, via the first connection destination storage control apparatus 200.

FIG. 18 is an explanatory diagram showing the overall configuration of the storage system of this embodiment. In this embodiment, the virtual volumes V1*a*, V1*b* within the connection source storage control apparatus 100 are associated with the real volumes V3*a*, V3*b* within the second connection destination storage control apparatus 300, via the virtual volumes V2*a*, V2*b* within the first connection destination storage control apparatus 200. And, the second connection destination storage control apparatus 300 is provided with a local volume copy function F21 and a drive power management function F22. The drive power management function F22 is a function for turning on and off the power supply of disk drives 311 and for making transitions into a low power consumption mode (standby mode).

FIG. 19 is a flowchart showing operation of the storage system. The host 10 issues an instruction for volume copying between the virtual volumes V1*a* and V1*b*, or for power management of the disk drives 311 of the virtual volumes V1*a* and V1*b* (S121). In the following explanation, the volume copy function F21 and drive power management function F22 may be called prescribed functions.

Upon receiving an instruction for execution of a prescribed function from the host 10 (S122), the controller 101 of the connection source storage control apparatus 100 executes the executing apparatus allocation processing described in conjunction with FIG. 9 (S123). Because the controller 101 cannot itself execute the prescribed function requested by the host 10, it transmits the instruction from the host 10 to the first connection destination storage control apparatus 200, and causes the instruction from the host 10 to be transferred to the second connection destination storage control apparatus 300.

The controller 201 of the first connection destination storage control apparatus 200, upon receiving the instruction from the controller 101 (S124), transfers the instruction to the controller 301 of the second connection destination storage control apparatus 300 (S125).

Upon receiving the instruction from the controller 201 (S126), the controller 301 of the second connection destination storage control apparatus 300 executes the specified function (S127), and notifies the controller 201 of the completion of processing (S128).

The controller 201, upon receiving notification of the completion of processing from the controller 301 (S129), notifies the controller 101 of the completion of processing (S130). The controller 101, upon receiving notification of the completion of processing from the controller 201 (S131), notifies the host 10 of the completion of processing (S132). The host 10, upon receiving notification from the controller 101 (S133), confirms that the processing specified in S121 has been performed normally.

Thus in this embodiment, the first connection destination storage control apparatus 200 is used as a command relay apparatus, and the second connection destination storage control apparatus 300 is used as the final processing apparatus for the command. By this means, in this embodiment the plurality of storage control apparatuses 100, 200, 300 can be cascade-connected using external connection functions, and a function requested by the host 10 can be caused to be executed by an appropriate storage control apparatus.

This invention is not limited to the above-described embodiments. Various additions and modifications can be made, within the scope of the invention, by a practitioner of the art.

What is claimed is:

1. A storage system comprising:

a first storage control apparatus which has first disk drives and is configured with logical volumes provided by storage areas of the first disk drives and configured with a first compression function; and a second storage control apparatus which has second disk drives and is configured with logical volumes provided by storage areas of the second disk drives and configured with a second compression function, wherein the first storage control apparatus is coupled to a host computer and the second storage control apparatus and configured to provide virtual volumes appearing as logical volumes therein to the host computer by mapping the virtual volumes to the logical volumes of the second storage control apparatus and storing write data from the host computer designated to the virtual volumes into the logical volumes of the second storage control apparatus, wherein the first storage control apparatus manages compression management information including virtual volume identifiers corresponding to the virtual volumes, logical volume identifiers corresponding to the logical volumes of the second storage control apparatus, apparatus identifiers indicating which one of the first compression function and the second compression function executes compression of the write data, and compression function execution conditions including load information of the first storage control apparatus and load information of the second storage control apparatus, wherein the first storage control apparatus manages first compression management information, including volume identifiers, addresses of the logical volumes before compression and addresses of the logical volumes after compression, and updates the first compression management information based on reception of the write data, wherein the second storage control apparatus manages second compression management information corresponding to the first compression management information, and updates the second compression management information based on the update of the first compression management information, and wherein after updating of the apparatus identifiers of the compression management information and switching execution of the compression of the write data from the first compression function to the second compression function, the first compression function being different from the second compression function, if the compression function execution conditions are satisfied, the second compression function executes the compression of the write data designated to the virtual volumes with the second compression management information, and stores compressed write data designated to the virtual volumes into the logical volumes thereof.

2. A storage system according to claim 1, wherein the first compression management information includes identifiers of compression algorithms, and wherein the second compression function chooses at least one of compression algorithms for the compression of the write data based on the second compression management information.

3. A storage system according to claim 1, wherein when the second storage control apparatus has a storage capacity smaller than that of the first storage control apparatus, and only the second compression function of the second storage control apparatus is enabled, the data compressed by the second compression function is stored into the first or a third storage control apparatus.

4. A storage system according to claim 1, wherein the execution conditions further include at least one of a time frame and an originating host number.

* * * * *